(12) United States Patent
Terada et al.

(10) Patent No.: US 8,942,724 B2
(45) Date of Patent: Jan. 27, 2015

(54) NUMBER OF TERMINAL ESTIMATION DEVICE AND NUMBER OF TERMINAL ESTIMATION METHOD

(75) Inventors: Masayuki Terada, Chiyoda-ku (JP); Motonari Kobayashi, Chiyoda-ku (JP); Ichiro Okajima, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 59 days.

(21) Appl. No.: 13/704,446

(22) PCT Filed: Oct. 13, 2011

(86) PCT No.: PCT/JP2011/073584
§ 371 (c)(1),
(2), (4) Date: Dec. 14, 2012

(87) PCT Pub. No.: WO2012/056900
PCT Pub. Date: May 3, 2012

(65) Prior Publication Data
US 2013/0090132 A1    Apr. 11, 2013

(30) Foreign Application Priority Data

Oct. 27, 2010  (JP) ................................. 2010-240551
Apr. 6, 2011   (JP) ................................. 2011-084796

(51) Int. Cl.
*H04W 24/00*    (2009.01)
*H04W 4/02*     (2009.01)
*H04W 64/00*    (2009.01)

(52) U.S. Cl.
CPC ............ *H04W 64/006* (2013.01); *H04W 4/028* (2013.01); *H04W 4/021* (2013.01)
USPC .................. 455/456.1; 455/456.2; 455/456.3; 455/404.2; 455/440

(58) Field of Classification Search
USPC .............. 455/456.1–456.3, 404.2, 422.1, 440
See application file for complete search history.

(56) References Cited

U.S. PATENT DOCUMENTS 6,898,423 B2 * 5/2005 Motegi et al. .............. 455/414.2
7,546,120 B1 * 6/2009 Ulvenes ..................... 455/422.1
(Continued)

FOREIGN PATENT DOCUMENTS

JP          2003-44969 A      2/2003

OTHER PUBLICATIONS

International Preliminary Report on Patentability issued May 23, 2013 in PCT/JP2011/073584 filed Oct. 13, 2011.
(Continued)

*Primary Examiner* — Kashif Siddiqui
*Assistant Examiner* — Mong-Thuy Tran
(74) *Attorney, Agent, or Firm* — Oblon, Spivak, McClelland, Maier & Neustadt, L.L.P.

(57) ABSTRACT

A number-of-terminals estimation device has a unit to acquire location data; a unit to acquire location acquisition time information of second location data immediately preceding the first location data and third location data immediately following the first location data, from location data including the same identification information; a unit to calculate a feature amount of the first location data, based on at least two of the location acquisition time information of the first to third location data; a unit to acquire observation target location data including location acquisition time information after an observation start time and before an observation end time and including location information corresponding to observation area information; and a unit to estimate the number of terminals located in the observation area during the observation period, based on feature amounts of the observation target location data and the length of the observation period.

26 Claims, 28 Drawing Sheets

(56) References Cited

U.S. PATENT DOCUMENTS

| | | | |
|---|---|---|---|
| 8,478,289 B1* | 7/2013 | Lookingbill et al. | 455/456.1 |
| 2011/0191052 A1* | 8/2011 | Lin et al. | 702/94 |
| 2011/0285591 A1* | 11/2011 | Wong | 342/451 |

OTHER PUBLICATIONS

Written Opinion issued Jan. 17, 2011 in PCT/JP2011/073584 filed Oct. 13, 2011.

* cited by examiner

*Fig.16*

| OBSERVATION AREA | ESTIMATED POPULATION | MEN | WOMEN | 20-24 AGE GROUP | 25-29 AGE GROUP | RESIDENTS IN TOKYO | RESIDENTS IN KANAGAWA |
|---|---|---|---|---|---|---|---|
| AREA A | 614 | 294 | 320 | 58 | 50 | 320 | 190 |
| ⋮ | | | | | | | |

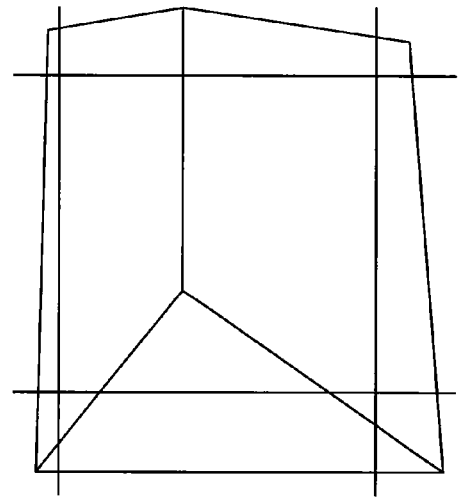
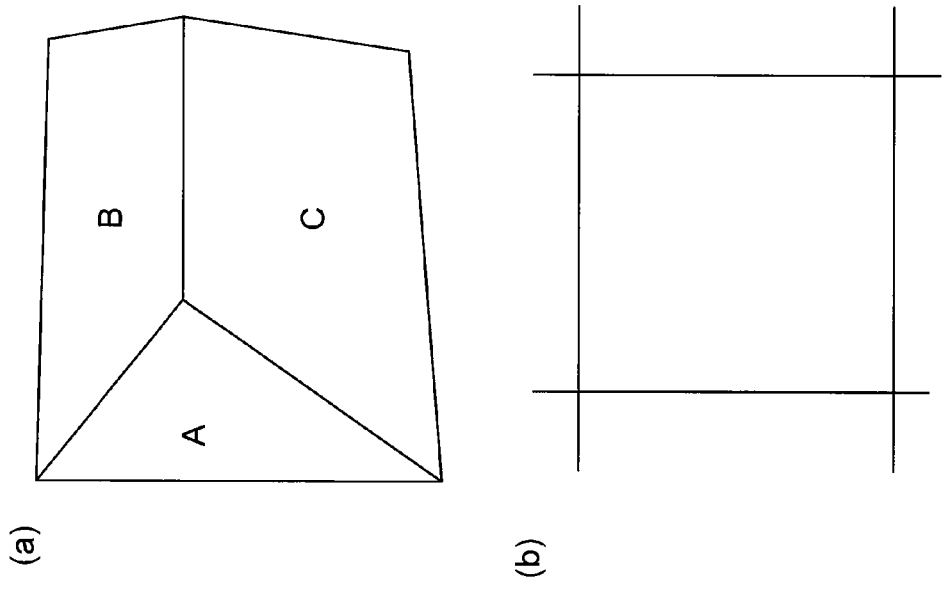
Fig. 18

Fig.22

$$\begin{pmatrix} Pop_{a_1} \\ Pop_{a_2} \\ Pop_{a_3} \\ \vdots \\ Pop_{a_n} \end{pmatrix} = \begin{pmatrix} k_{b_1 \to a_1} & k_{b_2 \to a_1} & k_{b_3 \to a_1} & \cdots & k_{b_m \to a_1} \\ k_{b_1 \to a_2} & k_{b_2 \to a_2} & k_{b_3 \to a_2} & \cdots & k_{b_m \to a_2} \\ k_{b_1 \to a_3} & k_{b_2 \to a_3} & k_{b_3 \to a_3} & \cdots & k_{b_m \to a_3} \\ \vdots & \vdots & \vdots & \ddots & \vdots \\ k_{b_1 \to a_n} & k_{b_2 \to a_n} & k_{b_3 \to a_n} & \cdots & k_{b_m \to a_n} \end{pmatrix} \begin{pmatrix} Pop_{b_1} \\ Pop_{b_2} \\ Pop_{b_3} \\ \vdots \\ Pop_{b_m} \end{pmatrix}$$

- First columns: CONVERSION COEFFICIENTS FOR 2 GHz/1.7 GHz OUTDOOR STATIONS
- Middle columns: CONVERSION COEFFICIENTS FOR 800MHz OUTDOOR STATIONS
- Last column: CONVERSION COEFFICIENTS FOR INDOOR STATIONS Right vector entries:
- $Pop_{b_1}$: ESTIMATED POPULATIONS FROM 2 GHz/1.7 GHz OUTDOOR STATIONS
- $Pop_{b_2}, Pop_{b_3}$: ESTIMATED POPULATIONS FROM 800MHz OUTDOOR STATIONS
- $Pop_{b_m}$: ESTIMATED POPULATION FROM INDOOR STATION $Pop_{a_i}$ : ESTIMATED POPULATION IN OUTPUT UNIT $a_i$ $Pop_{b_j}$ : ESTIMATED POPULATION IN TOTALIZATION UNIT $b_j$ $k_{b_j \to a_i}$ : CONVERSION COEFFICIENTS FROM $b_j$ TO $a_i$

NUMBER OF TERMINAL ESTIMATION DEVICE AND NUMBER OF TERMINAL ESTIMATION METHOD

TECHNICAL FIELD

The present invention relates to a number-of-terminals estimation device and a number-of-terminals estimation method to estimate the number of terminals located in a certain area, using location information about mobile terminals obtained from network facilities of the mobile terminals (e.g., cell phones).

BACKGROUND ART

In the network facilities of cell-phone operators, there appear operational data such as location data of cell phones and attribute data of users to provide telecommunications services to users of cell phones. By performing statistical processing such as totalization on these operational data, we can obtain estimated values about demographics such as "population distribution," "population change," and "population composition." Of these, the "population distribution" is a population distributed in each of areas, the "population change" is a change of population along a time axis in a certain area, and the "population composition" is information about a population distribution or a population change, for example, in divisions such as genders or age groups.

The aforementioned location data is, for example, location registration signals. They are signals transmitted approximately at regular intervals from a cell phone to a serving base station, and when a certain base station receives a location registration signal of a certain cell phone, it can be estimated that the cell phone exists in a sector being a coverage area of the base station, at a time of reception.

Another example of the location data is GPS information. This is information about the GPS positioning result transmitted at regular intervals from a cell phone to a serving base station or transmitted in accordance with an operation of the terminal or in accordance with a request from a cell phone network. With this information, it can also be estimated similarly that the cell phone exists around a location indicated by the GPS positioning result, at a time of reception of the GPS information (e.g., cf. Patent Literature 1).

If the number of cell phones (the number of terminals) existing in a certain geographical area can be estimated from the observation result of the location data as described above, we can expect that estimated values about the aforementioned various demographics are obtained by further taking a subscription rate of cell phones or the like into consideration.

CITATION LIST

Patent Literature

Patent Literature 1: Japanese Patent Application Laid-open No. 2003-44969

SUMMARY OF INVENTION

Technical Problem

However, it is not easy to correctly estimate the number of terminals from the location data as described above. This is because the location data of terminals such as the location registration signals and the GPS information are not always transmitted to the cell phone network but transmitted with some temporal intervals and the temporal intervals of transmission are not constant.

For example, let us consider a case where the number of terminals is estimated using the location registration signals as location data. If we can assume that the location registration signals are transmitted perfectly at regular intervals, the number of location registration signals received in a prescribed observation period in a certain sector will be proportional to the number of terminals in the sector. In fact, however, the location registration signals are basically transmitted, for example, on a periodic basis by a timer in each cell phone, but there are cases where a location registration signal is transmitted regardless of a state of the timer, at a time of a crossing between sectors of a certain specific base station and where transmission is delayed because of influence of calls, an out-of-service area, or the like. Concerning the GPS information, cycles of transmission and reception are not constant, either, because of various effects such as an out-of-service area and an operation of the terminal.

Let us consider combinational use of the location registration signals and the GPS information as location data. Since in this case the volume of information available for the number-of-terminals estimation increases, we can expect that the number of terminals can be estimated with higher accuracy. In this case, however, the frequency of transmission and reception of the location data including both of the two pieces of information becomes more random than in the cases using each of the two pieces of information, and if the number of terminals is estimated on the assumption that the cycles of transmission and reception are constant, the estimation accuracy could degrade on the contrary.

For this reason, it is necessary to take account of the variation in reception intervals of received signals, instead of simply counting the number of received signals, in order to accurately estimate the number of terminals.

The present invention has been accomplished in view of the foregoing and it is an object of the invention to accurately estimate the number of terminals while correcting the influence of variation in reception intervals, in estimating the number of terminals through the use of the location data.

Solution to Problem

A number-of-terminals estimation device according to an aspect of the present invention is a number-of-terminals estimation device comprising: location data acquisition means for acquiring location data including identification information to identify a mobile terminal, location information about a location of the mobile terminal, and location acquisition time information on a time when the location information is acquired; preceding and following location data acquisition means for, concerning a piece of first location data, acquiring location acquisition time information of second location data which is location data immediately preceding the first location data, and location acquisition time information of third location data which is location data immediately following the first location data, from location data including the same identification information as that of the first location data; feature amount calculation means for calculating a feature amount of the first location data, based on at least two of the location acquisition time information of the first location data, the location acquisition time information of the second location data, and the location acquisition time information of the third location data; observation target acquisition means for acquiring as observation target location data, one or more pieces of location data including location acquisition time information after an observation start time and before an observation end time about an observation period to be observed, and including location information associated with observation area information about an observation area to be observed; and number-of-terminals estimation means for estimating the number of terminals located in the observation area during the observation period, based on a feature amount of the observation target location data, and a length of the observation period which is a difference between the observation start time and the observation end time. The "feature amount" is information corresponding to an estimated generation density on the location data generated by the mobile terminal and the "estimated generation density" herein means an estimated value of the number of location data which the mobile terminal having generated the location data generates per unit time around a time of generation of the location data (corresponding to the foregoing location acquisition time). The foregoing number-of-terminals estimation device may be configured as follows: the feature amount calculation means calculates a difference between a location acquisition time of the second location data and a location acquisition time of the third location data, as the feature amount of the first location data, and the number-of-terminals estimation means estimates the number of terminals to be a numeral obtained by dividing a sum of feature amounts of the observation target location data by twice the length of the observation period. The detailed principle will be described later, but the number of terminals can be accurately estimated while correcting the influence of variation in reception intervals, by the configuration wherein the feature amount calculation means calculates the difference between the location acquisition times of the second and third location data as the feature amount of the first location data and wherein the number-of-terminals estimation means estimates the number of terminals to be the numeral obtained by dividing the sum of the feature amounts of the observation target location data by twice the length of the observation period.

The feature amount calculation means may operate as follows: when a difference between a location acquisition time of the first location data and the location acquisition time of the second location data is larger than a predetermined value, the feature amount calculation means calculates the feature amount of the first location information, using as the location acquisition time of the second location data, a time set backward by a predetermined time from the location acquisition time of the first location data. Similarly, the feature amount calculation means may operate as follows: when a difference between the location acquisition time of the first location data and the location acquisition time of the third location data is larger than a predetermined value, the feature amount calculation means calculates the feature amount of the first location information, using as the location acquisition time of the third location data, a time set forward by a predetermined time from the location acquisition time of the first location data. As the feature amount calculation means is made to operate as described above, when an acquisition time interval of location data becomes abnormally long because of the mobile terminal being located in an out-of-service area or because the mobile terminal being in a power-off mode, it is feasible to prevent the abnormally long acquisition time interval from excessively affecting the calculation result.

Incidentally, the feature amount calculation means may operate as follows: the feature amount calculation means makes a determination on whether or not the first location data includes location registration information generated due to a crossing across a location registration area border, and a determination on whether or not the third location data includes location registration information generated due to a crossing across a location registration area border; the feature amount calculation means calculates the feature amount of the first location data, using at least two of the location acquisition time information of the first location data, the location acquisition time information of the second location data, and the location acquisition time information of the third location data, according to the result of the determination on whether or not the first location data includes location registration information generated due to a crossing across a location registration area border and the result of the determination on whether or not the third location data includes location registration information generated due to a crossing across a location registration area border. In this case, though the detailed principle will be described later, the feature amount with high accuracy can be obtained taking account of the characteristics of the generation timing about the location registration information generated due to a crossing across a location registration area border. The "location registration information generated due to a crossing across a location registration area border" means location registration information generated because of a crossing of the mobile terminal across a border of a location registration area.

More specifically, the feature amount calculation means may operate as follows: when the first location data includes location registration information generated due to a crossing across a location registration area border, the feature amount calculation means sets the location acquisition time of the first location data to a first variable; when the first location data does not include location registration information generated due to a crossing across a location registration area border, the feature amount calculation means sets a midpoint time between the location acquisition time of the first location data and the location acquisition time of the second location data to the first variable; when the third location data includes location registration information generated due to a crossing across a location registration area border, the feature amount calculation means sets the location acquisition time of the third location data to a second variable; when the third location data does not include location registration information generated due to a crossing across a location registration area border, the feature amount calculation means sets a midpoint time between the location acquisition time of the first location data and the location acquisition time of the third location data to the second variable; the feature amount calculation means calculates the feature amount of the first location data, based on a difference between the set first variable and second variable.

The feature amount calculation means may operate as follows: when a difference between the location acquisition time of the first location data and a first variable is larger than a predetermined value, the feature amount calculation means calculates the feature amount of the first location data, using as the first variable, a time set backward by a predetermined time from the location acquisition time of the first location data. Similarly, the feature amount calculation means may operate as follows: when a difference between the location acquisition time of the first location data and a second variable is larger than a predetermined value, the feature amount calculation means calculates the feature amount of the first location data, using as the second variable, a time set forward by a predetermined time from the location acquisition time of the first location data. As the feature amount calculation means is made to operate as described above, when an acquisition time interval of location data becomes abnormally long because of the mobile terminal being located in an out-of-service area or because of the mobile terminal being in a power-off mode, it is feasible to prevent the abnormally long acquisition time interval from excessively affecting the calculation result.

Here, the number-of-terminals estimation device may be configured so that targets of calculation of the feature amount are the observation target location data acquired by the observation target acquisition means or so that the targets are all pieces of the location data acquired by the location data acquisition means. Of these, when the targets are the observation target location data acquired by the observation target acquisition means, the preceding and following location data acquisition means defines each piece of the observation target location data acquired by the observation target acquisition means, as the first location data, and acquires, for the first location data, the location acquisition time information of the second location data and the location acquisition time information of the third location data, the feature amount calculation means calculates the feature amount of each piece of the observation target location data, and the number-of-terminals estimation means estimates the number of terminals, using feature amounts of respective pieces of the observation target location data obtained by calculation.

On the other hand, when the targets are all pieces of the location data acquired by the location data acquisition means, the preceding and following location data acquisition means defines each piece of all the location data acquired by the location data acquisition means, as the first location data, and acquires, for the first location data, the location acquisition time information of the second location data and the location acquisition time information of the third location data, the feature amount calculation means calculates the feature amount of each piece of all the location data, and the number-of-terminals estimation means estimates the number of terminals, using feature amounts of the observation target location data among feature amounts of respective pieces of all the location data obtained by calculation.

A number-of-terminals estimation device according to another aspect of the present invention may be configured to comprise: location data acquisition means for acquiring location data including identification information to identify a mobile terminal, location information about a location of the mobile terminal, and location acquisition time information on a time when the location information is acquired; preceding and following location data acquisition means for, concerning a piece of first location data, acquiring location acquisition time information of second location data which is location data immediately preceding the first location data, and location acquisition time information of third location data which is location data immediately following the first location data, from location data including the same identification information as that of the first location data; feature amount calculation means for calculating a feature amount of the first location data, based on at least the location acquisition time information of the second location data and the location acquisition time information of the third location data; observation target acquisition means for acquiring as observation target location data, one or more pieces of location data including location acquisition time information after an observation start time and before an observation end time about an observation period to be observed, and including location information associated with observation area information about an observation area to be observed; and number-of-terminals estimation means for estimating the number of terminals located in the observation area during the observation period, based on a feature amount of the observation target location data, and a length of the observation period which is a difference between the observation start time and the observation end time.

The number-of-terminals estimation device may be configured as follows: it further comprises scaling factor storage means for storing an scaling factor for conversion of the number of terminals into a population; the number-of-terminals estimation means estimates at least one of a population in the observation area during the observation period, and populations in respective population estimation units which are units of estimation for population, based on feature amounts of the observation target location data, the length of the observation period, and the scaling factor. The foregoing "population estimation units" can be, for example, attributes, places, time zones, and so on. The scaling factor to be used may be one stored in the scaling factor storage means or one derived as follows. The scaling factor can be, for example, a reciprocal of "a product of a presence rate and a terminal penetration rate (i.e., a ratio of a presence count to a population)." The "presence rate" herein means a ratio of a presence count to the number of subscriptions and the "penetration rate" a ratio of the number of subscriptions to a population. Such an scaling factor is preferably derived for each of the foregoing population estimation units, but it is not essential.

The scaling factor may be derived, for example, using the number of terminals (presence count) estimated based on the feature amounts and the length of the observation period as follows. Namely, the feature amounts are calculated from the location data, the numbers of terminals in respective scaling factor calculation units are totalized based on the feature amounts and the observation period length to obtain user count pyramid data, and population pyramid data in the same scaling factor calculation units preliminarily obtained as statistical data (e.g., the Basic Resident Register or the like) is acquired. Then an acquisition rate of location data (i.e., presence count/population) is calculated in each of the scaling factor calculation units with the user count pyramid data and the population pyramid data. The "acquisition rate of location data (i.e., presence count/population)" obtained herein corresponds to the aforementioned "product of a presence rate and a terminal penetration rate." A reciprocal of the "acquisition rate of location data" obtained in this manner can be derived as an scaling factor. The scaling factor calculation units for calculation of the scaling factor to be employed may be, for example, prefectures of addresses, age groups at 5-year or 10-year intervals, genders, time zones of one-hour intervals, and so on, or may be combinations of two or more of these. For example, when an scaling factor calculation unit is "men in their twenties residing in Tokyo," location data extracted is location data corresponding to men in their twenties residing in Tokyo (namely, the address information in user attributes of which is Tokyo) in the whole of Japan; the number of terminals is counted to obtain user count pyramid data; population pyramid data about men in their twenties residing in Tokyo is acquired from the statistical data. In obtaining the user count pyramid data, as to the condition of "residing in Tokyo," the device does not extract only the location data of users residing in Tokyo, but the device extracts the location data the address information in user attributes of which is Tokyo. Then the acquisition rate (i.e., presence count/population) of the location data in the scaling factor calculation unit (men in their twenties residing in Tokyo herein) is calculated from the user count pyramid data and the population pyramid data, and a reciprocal of the obtained "acquisition rate of location data" can be derived as an scaling factor. In the present specification the description is given on the assumption that the scaling factor calculation units are equal to the population estimation units, but it is just an example, without having to be limited to this example.

The number-of-terminals estimation device may further comprise: conversion means for converting estimated values in respective observation areas obtained by estimation by the number-of-terminals estimation means, into estimated values in respective output units different from the observation areas, based on area ratios of overlap regions between the output units and the observation areas to the observation areas. The conversion means may operate as follows: when there are at least two communication areas out of a communication area of an indoor station and communications areas of a plurality of outdoor stations using respective frequency bands with different coverage areas, overlapping in a geographically identical observation area, the conversion means performs conversion into the estimated values in the respective output units based on the area ratios for each of the overlapping communication regions and addition of the estimated values after the conversion for each of the communication regions, thereby obtaining the estimated values in the respective output units.

The number-of-terminals estimation means may estimate populations separately in respective output units and in respective population estimation units, based on feature amounts of the observation target location data, the length of the observation period, an scaling factor for conversion of the number of terminals into a population, and area ratios of overlap regions between observation areas and output units different from the observation areas to the observation areas.

A mode of estimating populations separately in respective output units and in respective population estimation units may be as follows: prior to the estimation of populations by the number-of-terminals estimation means, location data is associated with the feature amount, the scaling factor, and a combination of the area ratio and an output unit ID related to the area ratio; the number-of-terminals estimation means calculates (feature amount×area ratio×scaling factor) on location data with which the same output unit ID is associated, totalizes values of (feature amount×area ratio×scaling factor) in respective output units obtained, for each of the population estimation units, and estimates the populations in respective output units and in respective population estimation units, based on total values in respective output units and in respective population estimation units obtained and the length of the observation period.

The number-of-terminals estimation device may further comprise: observation period acquisition means for acquiring observation period information including a set of an observation start time and an observation end time; and observation area acquisition means for acquiring observation area information associated with one or more pieces of location information.

The number-of-terminals estimation device may further comprise output means for outputting the estimated value obtained. An output form by the output means is allowed to be at least one of a drawing showing a population distribution, a drawing showing a time-series population change, and a drawing showing a population composition, and an output unit by the output means is allowed to be set according to at least one of an attribute of a user of a mobile terminal, a time zone, and a place.

The number-of-terminals estimation device may be configured as follows: it further comprises unidentifiability securing means for performing an unidentifiability securing process including a conversion into irreversible code by a one-way function on identification information included in the location data acquired by the location data acquisition means; the unidentifiability securing means operates as follows: when a process using attribute information of a user of a mobile terminal is carried out, the unidentifiability securing means performs the unidentifiability securing process on the attribute information, before the process.

The number-of-terminals estimation device may further comprise: concealment process means for, before an estimated value obtained is output, performing a concealment process on the estimated value on the basis of a predetermined reference. In that case, the concealment process means may operate as follows: the concealment process means determines whether or not the number of source terminals indicative of from how many terminals the location data in each area as foundation of estimation was acquired, is less than a reference value for a determination that the concealment process is needed; when the number of source terminals of the location data in a certain area is less than the reference value, the concealment process means conceals the estimated value about the area. The number of source terminals indicates the unique number of terminals without redundancy of identical terminal.

The concealment method adopted herein can be, for example, a method of setting the estimated value to zero, a method of expressing the estimated value by a predetermined letter or mark (e.g., "X" or the like), and so on. On the other hand, when the number of source terminals of the location data in an area is not less than the reference value, the concealment process means may be configured not to perform the concealment process on the estimated value or may be configured to perform rounding as described below. Namely, the concealment process means may operate as follows: the concealment process means rounds the estimated value on the area, based on an upper limit value and a lower limit value of a class to which the estimated value on the area belongs out of a plurality of classes used in output of estimated value, a class interval, and the estimated value, to the upper limit value and the lower limit value with respective probability values according to a difference from the upper limit value and a difference from the lower limit value.

The invention of the number-of-terminals estimation devices described above can also be regarded as the invention of number-of-terminals estimation methods executed by the number-of-terminals estimation devices, with the same action and effect. Specifically, the methods can be described as below, according to the configuration wherein the feature amount is calculated for each target of the observation target location data or according to the configuration wherein the feature amount is calculated for each target of all the location data acquired.

A number-of-terminals estimation method according to an aspect of the present invention is a number-of-terminals estimation method executed by a number-of-terminals estimation device, comprising: a location data acquisition step of acquiring location data including identification information to identify a mobile terminal, location information about a location of the mobile terminal, and location acquisition time information on a time when the location information is acquired; an observation target acquisition step of acquiring as observation target location data, one or more pieces of location data including location acquisition time information after an observation start time and before an observation end time about an observation period to be observed, and including location information associated with observation area information about an observation area to be observed; a preceding and following location data acquisition step of defining each piece of the observation target location data acquired, as first location data, and, concerning each piece of the first location data, acquiring location acquisition time information of second location data which is location data immediately preceding the first location data and location acquisition time information of third location data which is location data immediately following the first location data, from location data including the same identification information as that of the first location data; a feature amount calculation step of calculating a feature amount of each piece of the observation target location data, based on at least two of the location acquisition time information of the first location data, the location acquisition time information of the second location data, and the location acquisition time information of the third location data; and a number-of-terminals estimation step of estimating the number of terminals located in the observation area during the observation period, based on the feature amount of the observation target location data obtained by calculation, and a length of the observation period which is a difference between the observation start time and the observation end time.

A number-of-terminals estimation method according to another aspect of the present invention is a number-of-terminals estimation method executed by a number-of-terminals estimation device, comprising: a location data acquisition step of acquiring location data including identification information to identify a mobile terminal, location information about a location of the mobile terminal, and location acquisition time information on a time when the location information is acquired; a preceding and following location data acquisition step of defining each piece of all the location data acquired, as first location data, and, concerning each piece of the first location data, acquiring location acquisition time information of second location data which is location data immediately preceding the first location data and location acquisition time information of third location data which is location data immediately following the first location data, from location data including the same identification information as that of the first location data; a feature amount calculation step of calculating feature amounts of respective pieces of all the location data, based on at least two of the location acquisition time information of the first location data, the location acquisition time information of the second location data, and the location acquisition time information of the third location data; an observation target acquisition step of acquiring as observation target location data, one or more pieces of location data including location acquisition time information after an observation start time and before an observation end time about an observation period to be observed, and including location information associated with observation area information about an observation area to be observed; and a number-of-terminals estimation step of estimating the number of terminals located in the observation area during the observation period, based on a feature amount of the observation target location data out of the feature amounts of the respective pieces of all the location information obtained by calculation, and a length of the observation period which is a difference between the observation start time and the observation end time.

A number-of-terminals estimation method according to still another aspect of the present invention is a number-of-terminals estimation method executed by a number-of-terminals estimation device, comprising: a location data acquisition step of acquiring location data including identification information to identify a mobile terminal, location information about a location of the mobile terminal, and location acquisition time information on a time when the location information is acquired; an observation target acquisition step of acquiring as observation target location data, one or more pieces of location data including location acquisition time information after an observation start time and before an observation end time about an observation period to be observed, and including location information associated with observation area information about an observation area to be observed; a preceding and following location data acquisition step of defining each piece of the observation target location data acquired, as first location data, and, concerning each piece of the first location data, acquiring location acquisition time information of second location data which is location data immediately preceding the first location data and location acquisition time information of third location data which is location data immediately following the first location data, from location data including the same identification information as that of the first location data; a feature amount calculation step of calculating a feature amount of each piece of the observation target location data, based on at least the location acquisition time information of the second location data and the location acquisition time information of the third location data; and a number-of-terminals estimation step of estimating the number of terminals located in the observation area during the observation period, based on the feature amount of the observation target location data obtained by calculation, and a length of the observation period which is a difference between the observation start time and the observation end time.

A number-of-terminals estimation method according to still another aspect of the present invention is a number-of-terminals estimation method executed by a number-of-terminals estimation device, comprising: a location data acquisition step of acquiring location data including identification information to identify a mobile terminal, location information about a location of the mobile terminal, and location acquisition time information on a time when the location information is acquired; a preceding and following location data acquisition step of defining each piece of all the location data acquired, as first location data, and, concerning each piece of the first location data, acquiring location acquisition time information of second location data which is location data immediately preceding the first location data and location acquisition time information of third location data which is location data immediately following the first location data, from location data including the same identification information as that of the first location data; a feature amount calculation step of calculating a feature amount of each piece of all the location data, based on at least the location acquisition time information of the second location data and the location acquisition time information of the third location data; an observation target acquisition step of acquiring as observation target location data, one or more pieces of location data including location acquisition time information after an observation start time and before an observation end time about an observation period to be observed, and including location information associated with observation area information about an observation area to be observed; and a number-of-terminals estimation step of estimating the number of terminals located in the observation area during the observation period, based on a feature amount of the observation target location data out of the feature amounts of the respective pieces of all the location information obtained by calculation, and a length of the observation period which is a difference between the observation start time and the observation end time.

Advantageous Effect of Invention

The present invention has successfully achieved the accurate estimation of the number of terminals while correcting the influence of variation in reception intervals.

BRIEF DESCRIPTION OF DRAWINGS

FIG. 16 is a drawing showing an output example in the population estimation process.

FIG. 18 is a drawing for explaining a combination of meshes and an area map.

FIG. 22 is a drawing showing a matrix equation for conversion into an estimated population in a target output unit.

DESCRIPTION OF EMBODIMENTS

Embodiments of the present invention will be described below with reference to the accompanying drawings. The same portions will be denoted by the same reference signs as much as possible, without redundant description.

[First Embodiment]

[Configuration of Communication System]

Figure 1:
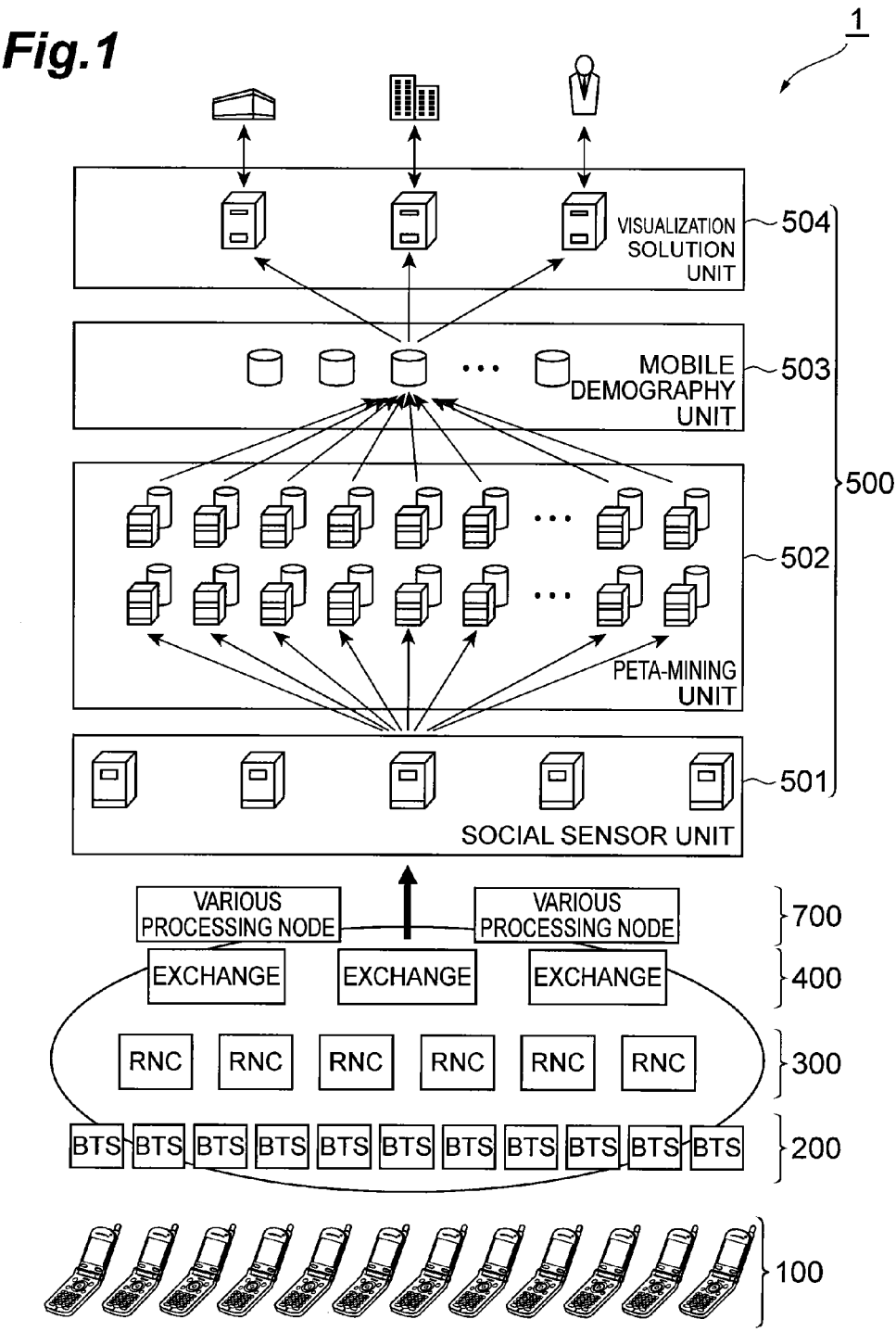
FIG. 1 is a drawing showing a system configuration of a communication system in the first to sixth embodiments.

FIG. 1 is a system configuration diagram of a communication system 1 of the present embodiment. As shown in FIG. 1, this communication system 1 is configured to include mobile terminals 100, BTSs (base transceiver stations) 200, RNCs (radio network controllers) 300, exchanges 400, various processing nodes 700, and a management center 500. This management center 500 is composed of a social sensor unit 501, a peta-mining unit 502, a mobile demography unit 503, and a visualization solution unit 504.

The exchanges 400 collect below-described location information on the mobile terminals 100 through the BTSs 200 and RNCs 300. The RNCs 300 are able to measure locations of the mobile terminals 100 through the use of delay values in RRC connection request signals, during execution of communication connections with the mobile terminals 100. The exchanges 400 are able to receive the location information of the mobile terminals 100 measured as described above, during execution of communication connections by the mobile terminals 100. The exchanges 400 store the received location information and outputs the collected location information to the management center 500 at predetermining timing or in response to a request from the management center 500.

The various processing nodes 700 acquire the location information of the mobile terminals 100 through the RNCs 300 and exchanges 400, perform re-calculation of location or the like if necessary, and output the collected location information to the management center 500 at predetermining timing or in response to a request from the management center 500.

The location information of mobile terminals 100 to be employed in the present embodiment can be sector numbers indicative of local sectors acquired from location registration signals, location positioning data obtained by a location information acquisition system such as the GPS positioning system or PRACH PD, and so on. The location data of a mobile terminal 100 includes identification information to identify the mobile terminal (e.g., information associated with the mobile terminal, such as a line number), and location acquisition time information on a time when the location information is acquired, in addition to the aforementioned location information. When the line number is used as the identification information, it is preferable to use a value associated with the line number (e.g., a hash of the line number or the like), instead of direct use of the line number (i.e., it is preferable to make the line number unidentifiable). When processing according to each of user attributes is performed using the value associated with the line number (e.g., a hash of a line number or the like) as described above, it is also necessary to use a value associated with user-identifiable information in attribute information, instead of the user-identifiable information itself (i.e., it is necessary to make the user-identifiable information unidentifiable). Such unidentifiability securing process will be described in detail in the eighth embodiment.

The management center 500, as described above, is configured to include the social sensor unit 501, peta-mining unit 502, mobile demography unit 503, and visualization solution unit 504, and each unit performs statistical processing using the location information of mobile terminals 100. A below-described number-of-terminals estimation device 10 (FIG. 2) can be composed, for example, of the management center 500.

The social sensor unit 501 consists of server apparatus to collect data including the location information of mobile terminals 100 and others, from each exchange 400 and various processing node 700, or, off-line. This social sensor unit 501 is configured so as to be able to receive data output at regular intervals from the exchanges 400 and various processing nodes 700 or to acquire data from the exchanges 400 and various processing nodes 700 in accordance with timing predetermined in the social sensor unit 501.

The peta-mining unit 502 consists of server apparatus to convert data received from the social sensor unit 501, into a predetermined data format. For example, the peta-mining unit 502 performs a sorting process using user IDs as key or a sorting process on an area basis.

The mobile demography unit 503 consists of server apparatus to perform a totalization process on the data processed in the peta-mining unit 502, i.e., a counting process of each item. For example, the mobile demography unit 503 is able to count the number of users located in a certain area and to totalize distributions of presence count.

The visualization solution unit 504 consists of server apparatus to visualize the data totalized in the mobile demography unit 503. For example, the visualization solution unit 504 is able to perform a mapping process of mapping the totalized data on a map. The data processed by this visualization solution unit 504 is provided to companies, public agencies, individuals, or the like to be used in development of shops, surveys of road traffic, countermeasures against natural disasters, countermeasures against environmental damage, and so on. Such statistically processed information is processed so that individuals or the like cannot be identified therefrom, in order to prevent invasions of privacy, as a matter of course.

Each of the social sensor unit 501, peta-mining unit 502, mobile demography unit 503, and visualization solution unit 504 is composed of the server apparatus as described above, and it is needless to mention that each unit has an ordinary basic configuration of information processing device (i.e., CPU, RAM, ROM, input devices such as keyboard and mouse, a communication device for communication with the outside, a memory device to store information, and output devices such as display and printer), illustration of which is omitted herein.

[Configuration of Number-of-Terminals Estimation Device]

Figure 2:
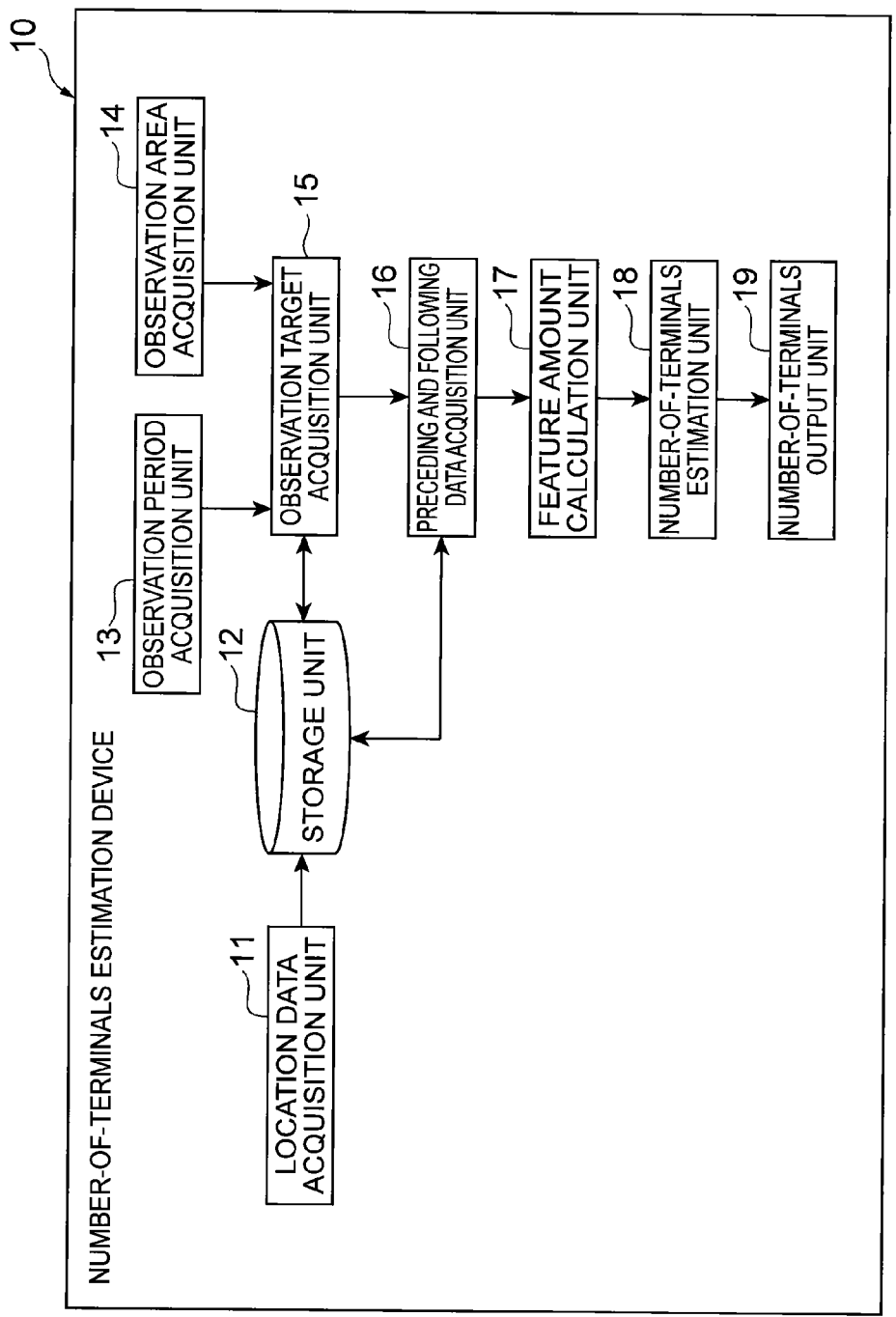
FIG. 2 is a drawing showing a configuration of a number-of-terminals estimation device in the first embodiment.

Next, the number-of-terminals estimation device according to the present embodiment will be described. FIG. 2 shows a function block configuration of the number-of-terminals estimation device 10. As shown in this FIG. 2, the number-of-terminals estimation device 10 is provided with a location data acquisition unit 11 (location data acquisition means), a storage unit 12, an observation period acquisition unit 13 (observation period acquisition means), an observation area acquisition unit 14 (observation area acquisition means), an observation target acquisition unit 15 (observation target acquisition means), a preceding and following location data acquisition unit 16 (preceding and following location data acquisition means), a feature amount calculation unit 17 (feature amount calculation means), a number-of-terminals estimation unit 18 (number-of-terminals estimation means), and a number-of-terminals output unit 19 (output means).

The functions of the respective units in the number-of-terminals estimation device 10 in FIG. 2 will be described below. The location data acquisition unit 11 acquires the aforementioned location data from the outside and stores the location data into the storage unit 12. The storage unit 12 stores the location data over a plurality of times on a large number of users (mobile terminals). The observation period acquisition unit 13 acquires observation period information including a set of an observation start time and an observation end time. The observation area acquisition unit 14 acquires observation area information associated with one or more pieces of location information. The observation area information herein is provided, for example, as sector number, latitude and longitude, geographical range (e.g., name of local government), or the like and the observation area acquisition unit 14 is preferably provided with a database to manage correspondence information between an expression form of the acquired observation area information and an expression form of location information (e.g., correspondence relation information between sector numbers and latitudes/longitudes, or the like).

The observation target acquisition unit 15 acquires as observation target location data, one or more pieces of location data including location acquisition time information after an observation start time and before an observation end time about an observation period to be observed, and location information associated with observation area information about an observation area to be observed, from the storage unit 12. The observation target location data may be further subjected to a narrowing process by a separately given condition (e.g., age groups of users of mobile terminals or the like).

The preceding and following location data acquisition unit 16 acquires, concerning a piece of location data as a target on which a feature amount is calculated (which will be referred to hereinafter as "first location data"), the location acquisition time information of location data immediately preceding the first location data (which will be referred to hereinafter as "second location data") and the location acquisition time information of location data immediately following the first location data (which will be referred to hereinafter as "third location data"), from location data including the same identification information as that of the first location data. It is not essential for the preceding and following location data acquisition unit 16 to acquire the whole of the second or third location data, but it is sufficient for the preceding and following location data acquisition unit 16 to acquire, at least, the location acquisition time information in the location data.

In the first embodiment, the preceding and following location data acquisition unit 16 defines the observation target location data acquired by the observation target acquisition unit 15, as the first location data and acquires the location acquisition time information of the second and third location data on the first location data, and the below-described feature amount calculation unit 17 calculates the feature amount of the observation target location data. Namely, the first embodiment is an embodiment wherein the location data of the target on which the feature amount is calculated, is narrowed down to the observation target location data. In contrast to it, the second embodiment below will describe an example in which the feature amount is calculated on each of targets of all the location data acquired.

The feature amount calculation unit 17 calculates the feature amount of each piece of first location data (the observation target location data in the first embodiment). For example, the feature amount calculation unit 17 calculates a difference between a location acquisition time of the second location data and a location acquisition time of the third location data, as the feature amount of the first location data. When the location acquisition time of the second location data is an abnormal value, e.g., when a difference between the location acquisition time of the first location data and the location acquisition time of the second location data is larger than a predetermined reference value (e.g., one hour) as an example, the feature amount calculation unit 17 uses as the location acquisition time of the second location data, a time set forward by a predetermined time (e.g., one hour) from the location acquisition time of the first location data to calculate the feature amount of the first location data. Similarly, when the location acquisition time of the third location data is an abnormal value, e.g., when a difference between the location acquisition time of the first location data and the location acquisition time of the third location data is larger than a predetermined reference value (e.g., one hour) as an example, the feature amount calculation unit 17 uses as the location acquisition time of the third location data, a time set forward by a predetermined time (e.g., one hour) from the location acquisition time of the first location data to calculate the feature amount of the first location data. These processes in the case where the location acquisition time of the second or third location data is an abnormal value are not indispensable processes, but execution of the above processes can prevent such inconvenience that when an acquisition time duration of location data becomes abnormally long because of the mobile terminal 100 being located in an out-of-service area or because of the mobile terminal 100 being in a power-off mode, the abnormally long acquisition time duration excessively affects the calculation result.

The number-of-terminals estimation unit 18 estimates the number of terminals located in the observation area during the observation period, based on the feature amounts of the observation target location data and the length of the observation period which is the difference between the observation start time and the observation end time. The details will be described later, but the number-of-terminals estimation unit 18 estimates the number of terminals to be a numeral obtained by dividing the sum of the feature amounts of the observation target location data by twice the length of the observation period.

The number-of-terminals output unit 19 outputs the number of terminals obtained by the estimation. The output herein includes a variety of output forms such as display output, voice output, and print output.

[Conception of Number-of-Terminals Estimation and Calculation Method]

Figure 3:
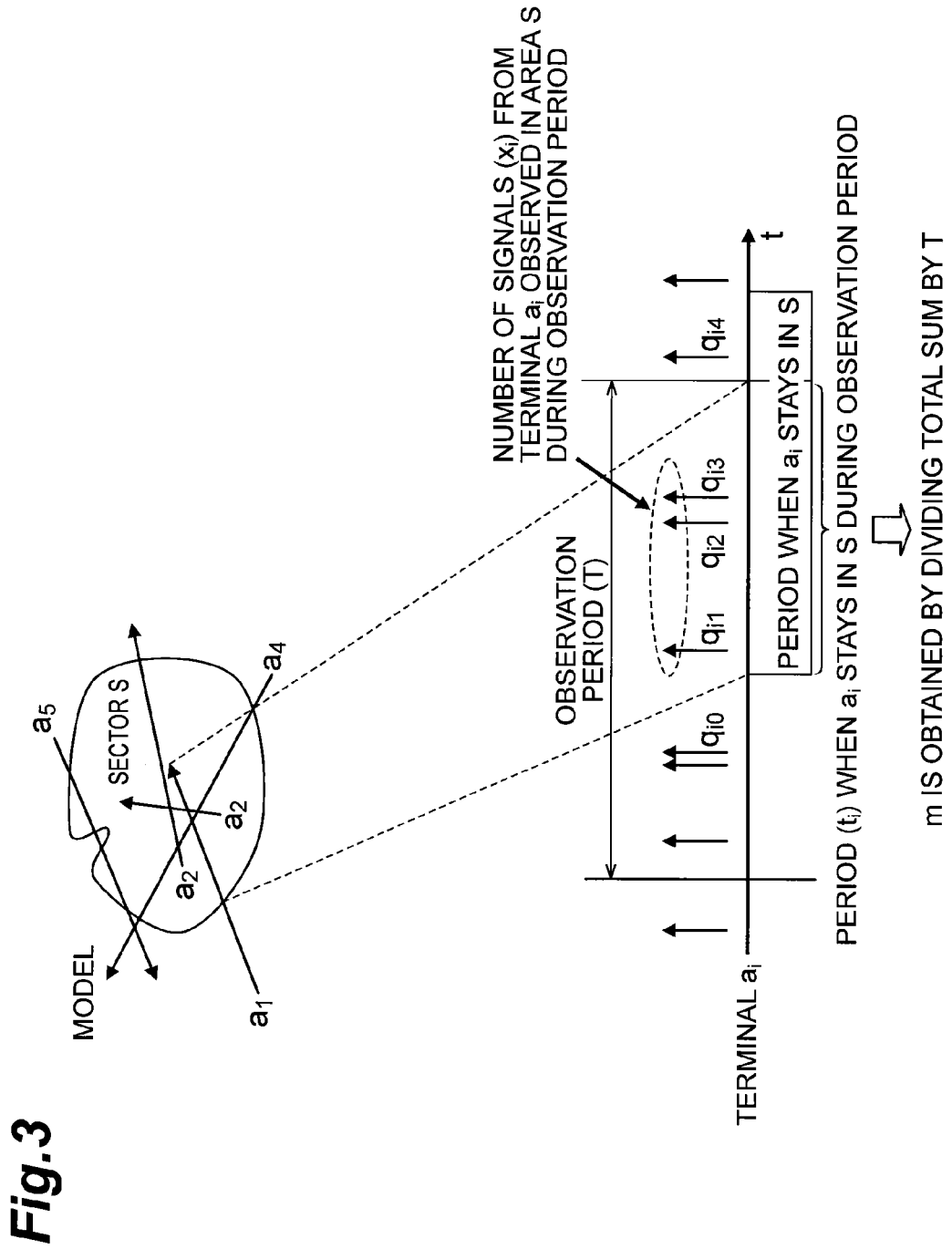
FIG. 3 is a drawing for explaining a first conception of number-of-terminals estimation.

Next, the conception of number-of-terminals estimation and calculation method will be described. Let us assume, like the model shown in FIG. 3, that n terminals $a_1, a_2, \ldots, a_n$ pass a sector S during a certain observation period (length T) and a duration of period when each terminal $a_i$ stays in the sector S during the observation period is $t_i$ ($0 < t_i \leq T$). In this case, the number m of terminals existing in the sector S (in fact, an average in the observation period of the number m of terminals existing in the sector S) is represented by Equation (1) below.

$$m = \sum_{i=1}^{m} t_i / T \qquad (1)$$

Namely, the result of a division of the sum of the durations $t_i$ of respective terminals $a_i$ in the sector S during the observation period by the length T of the observation period is estimated as the number m of terminals. However, true values of the durations $t_i$ of the respective terminals $a_i$ in the sector S during the observation period are unobservable, but each terminal $a_i$ sends signals (e.g., location registration signals), which are observable.

Let us assume that signals sent in the sector S during the observation period by terminal $a_i$, are defined in chronological order as follows.

$$q_{i1}, q_{i2}, \ldots, q_{ix_i}$$

(where $x_i$ is a total number of signals sent in the sector S during the observation period by terminal $a_i$). Then the estimation of the number of terminals is nothing but estimating the value of m from the observed signals $q_{ij}$ (where j is an integer of not less than 1 and not more than $x_i$).

Figure 4:
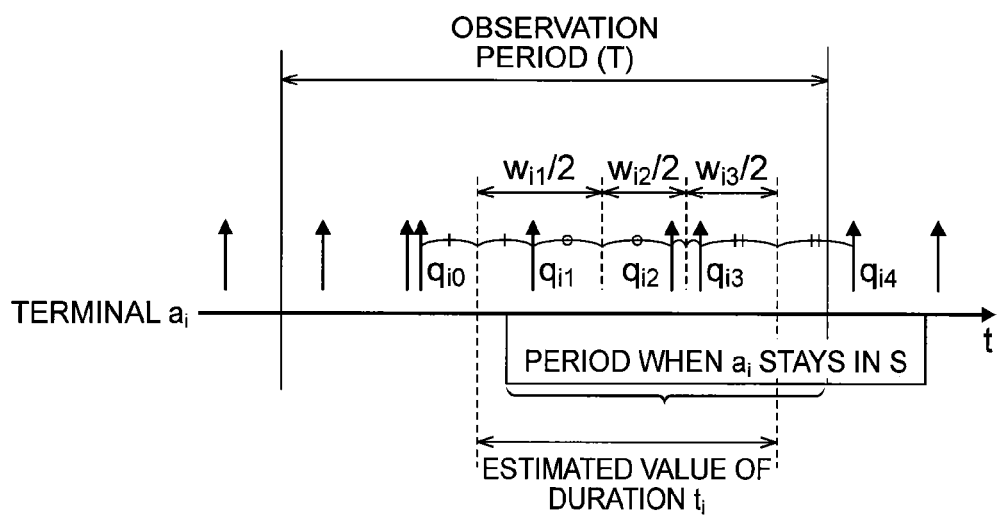
FIG. 4 is a drawing for explaining a first calculation method related to number-of-terminals estimation.

Now, let us explain the calculation method of number-of-terminals estimation on the basis of FIG. 4. It is assumed that a density of signals $q_{ij}$ transmitted from terminal $a_i$ (i.e., the number of signals per unit time) is $p_i$. At this time, supposing that a probability of transmission of signal is independent of the sector, an expectation $E(x_i)$ of a total $x_i$ of signals sent in the sector S during the observation period by terminal $a_i$ is given by $E(x_i) = t_i \times p_i$, and therefore Equation (2) below holds as to an expectation $E(t_i)$ of the duration $t_i$ of terminal $a_i$ in the sector S during the observation period.

$$E(t_i) = x_i / p_i \qquad (2)$$

When a transmission time of each signal $q_{ij}$ is represented by $u_{ij}$, a density $p_{ij}$ of signal $q_{ij}$ is given by Equation (3) below.

$$p_{ij} = 2/(u_{i(j+1)} - u_{i(j-1)}) \qquad (3)$$

When the signal $q_{ij}$ is assumed to be a signal related to the first location data, the signal $q_{i(j-1)}$ corresponds to a signal related to the second location data and the signal $q_{i(j+1)}$ to a signal related to the third location data. In the present embodiment, a difference between the transmission time $u_{i(j-1)}$ of the signal $q_{i(j-1)}$ related to the second location data and the transmission time $u_{i(j+1)}$ of the signal $q_{i(j+1)}$ related to the third location data, i.e., $(u_{i(j+1)} - u_{i(j-1)})$ in above Equation (3) is defined as a feature amount $w_{ij}$ on the first location data. Therefore, Equation (3) above can be written into the Equation (4) below. Namely, the feature amount $w_{ij}$ can be calculated in correspondence to a reciprocal of the density $p_{ij}$.

$$p_{ij} = 2/(u_{i(j+1)} - u_{i(j-1)}) = 2/w_{ij} \qquad (4)$$

At this time, the density $p_i$ is given by the following Equation (5).

$$p_i = x_i / E(t_i) = \left( x_i / \sum_{j=1}^{x_i} w_{ij} \right) \times 2 \qquad (5)$$

Therefore an estimated value $E(m)$ of the number m of terminals can be calculated according to Equation (6) below.

$$E(m) = \left( \sum_{i=1}^{n} \sum_{j=1}^{x_i} (w_{ij}/2) \right) / T = \left( \sum_{i=1}^{n} \sum_{j=1}^{x_i} w_{ij} \right) / 2T \qquad (6)$$

When it is assumed as shown in the example of FIG. 4 that in the observation period and in the period when the terminal $a_i$ stays in the sector S, the terminal $a_i$ transmits signals $q_{i1}, q_{i2}$, and $q_{i3}$, that the terminal $a_i$ transmits a signal $q_{i0}$ immediately before the signal $q_{i1}$ and transmits a signal $q_{i4}$ immediately after the signal $q_{i3}$, and that the transmission times of the signals $q_{i0}, q_{i1}, q_{i2}, q_{i3}$, and $q_{i4}$ are $u_{i0}, u_{i1}, u_{i2}, u_{i3}$, and $u_{i4}$, respectively, the aforementioned conception is equivalent to estimating the duration $t_i$ of the terminal $a_i$ in the sector S during the observation period to be a duration from (a midpoint between $u_{i0}$ and $u_{i1}$) to (a midpoint between $u_{i3}$ and $u_{i4}$).

The terminal $a_i$ transmits the signal $q_{i4}$ while staying in the sector S, but not during the observation period. However, in order to maintain unbiasedness of the estimated value of the duration $t_i$, a process without an estimation of estimating the end time of the duration $t_i$ to be the same as the end time of the observation period T will be described as an example herein.

[Number-of-Terminals Estimation Process]

A number-of-terminals estimation process according to a number-of-terminals estimation method of the present invention will be described below. It is assumed herein as an example that the location information in the location data of a mobile terminal given herein includes a sector number of a sector in which the mobile terminal stays.

Figure 5:
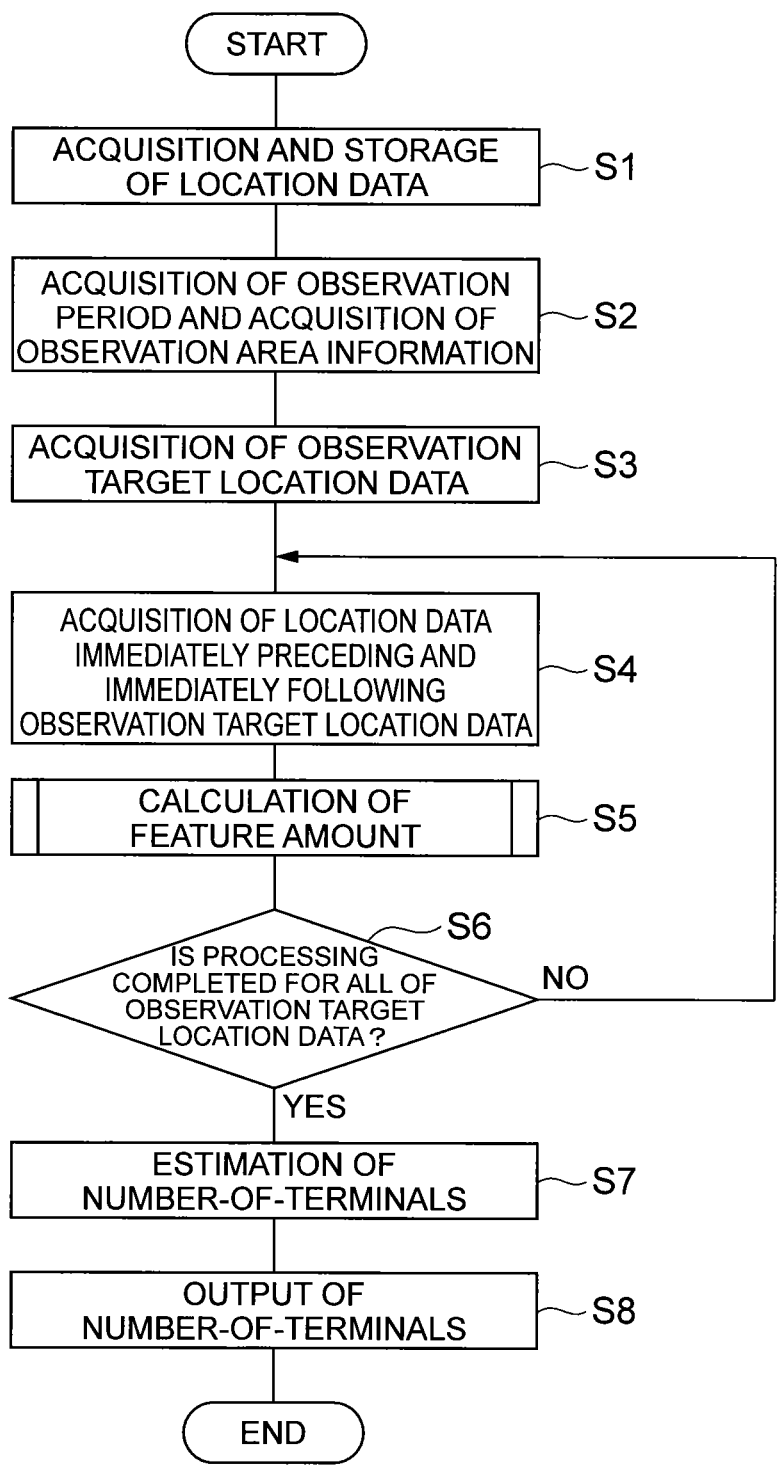
FIG. 5 is a flowchart showing a number-of-terminals estimation process in the first embodiment.

As shown in FIG. 5, first, the location data acquisition unit 11 acquires the location data from the outside and stores the location data into the storage unit 12 (step S1 in FIG. 5). Through this step, the storage unit 12 comes to store the location data over a plurality of times on a large number of users (mobile terminals). After execution of the process in step S1, processes in step S2 and subsequent steps may be executed after a lapse of some time. Namely, step S1 may be executed as a preparation step before the processes in step S2 and subsequent steps.

Next, the observation period acquisition unit 13 acquires the observation period information including a set of an observation start time and an observation end time and the observation area acquisition unit 14 acquires the observation area information associated with one or more pieces of location information (step S2). It is assumed herein that a set of observation start time T1 and observation end time T2 is acquired as the observation period information and that a sector number S is acquired as the observation area information.

Next, the observation target acquisition unit 15 acquires, as the observation target location data, one or more pieces of location data including the location acquisition time information after the observation start time T1 and before the observation end time T2 and including the location information associated with the sector number S as the observation area information (e.g., location data the location information of which is the sector number S), from the storage unit 12 (step S3). Namely, the observation target acquisition unit 15 acquires the location data meeting the following conditions, as the observation target location data.

Condition 1: the location acquisition time is after the observation start time T1 and before the observation end time T2. Namely, the location acquisition time is within the observation period.

Condition 2: the location information is sector S.

Next, the processes in steps S4 and S5 below are executed for each piece of the acquired observation target location data. In step S4, concerning a piece of location data (first location data) as a target for calculation of the feature amount out of the observation target location data, the preceding and following location data acquisition unit 16 acquires the location acquisition time information of the location data (second location data) immediately preceding the first location data and the location acquisition time information of the location data (third location data) immediately following the first location data, in view of their location acquisition times, from the location data including the same identification information as that of the first location data. It is noted herein that it is not essential for the preceding and following location data acquisition unit 16 to acquire the whole of the second and third location data, but it is sufficient for the preceding and following location data acquisition unit 16 to acquire the location acquisition time information in the second and third location data.

Then, in step S5 the feature amount calculation unit 17 calculates the feature amount of the first location data. The content of the process will be described using FIG. 6. It is assumed herein that the location acquisition times of the first, second, and third location data are t1, t2, and t3, respectively. It is also assumed that a reference value A (e.g., one hour) is defined as a predetermined reference value of a reference to determine that the location acquisition time t2 of the second location data is an abnormal value (a reference value about a difference between the location acquisition times of the first and second location data) and that a reference value B (e.g., one hour) is defined as a predetermined reference value of a reference to determine that the location acquisition time t3 of the third location data is an abnormal value (a reference value about a difference between the location acquisition times of the first and third location data).

Figure 6:
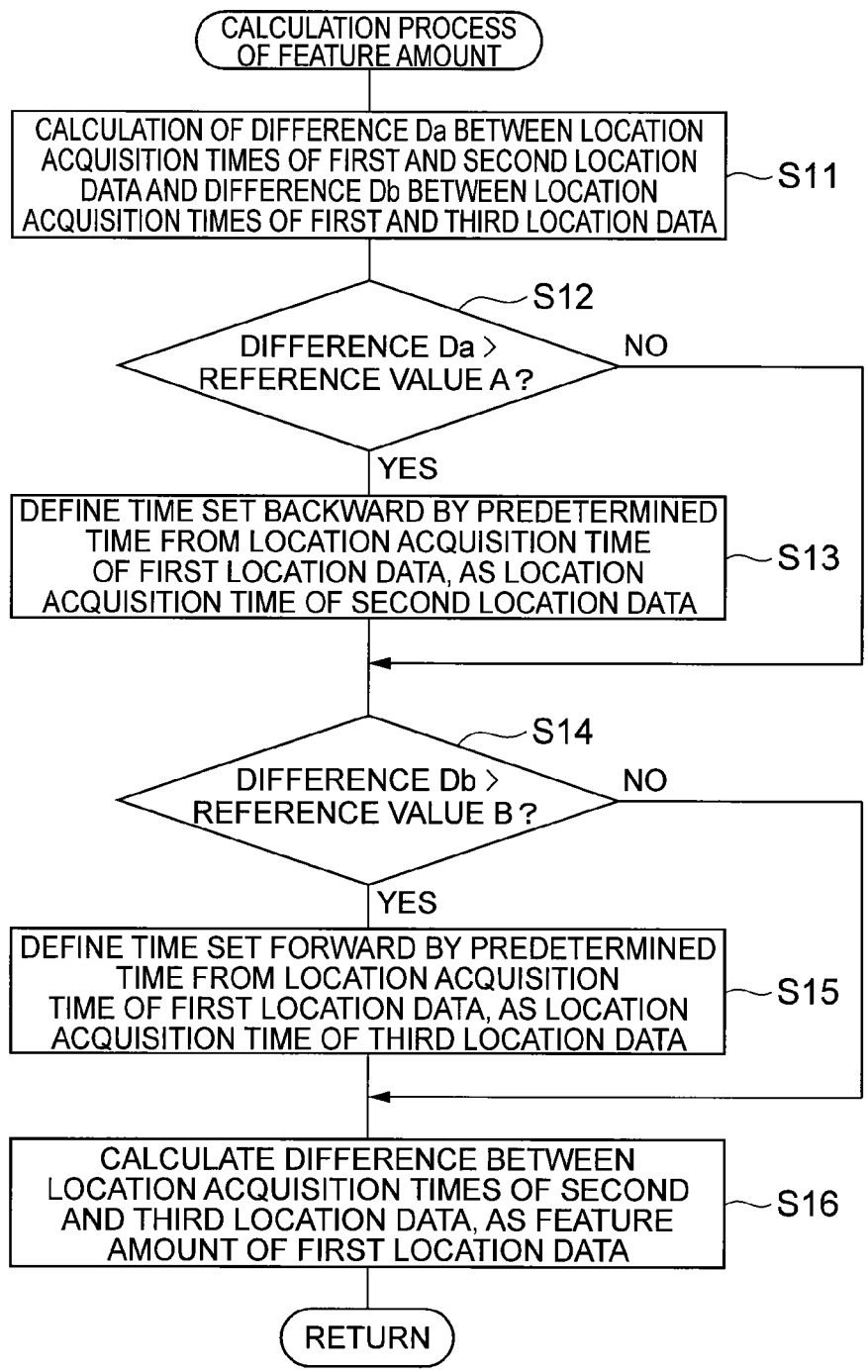
FIG. 6 is a flowchart showing a feature amount calculation process in the first and second embodiments.

The feature amount calculation unit 17 calculates the difference Da between the location acquisition times of the first and second location data (i.e., the difference between times t1 and t2), and the difference Db between the location acquisition times of the first and third location data (i.e., the difference between times t1 and t3) (step S11 in FIG. 6). Then the feature amount calculation unit 17 determines whether the difference Da between the location acquisition times of the first and second location data is larger than the predetermined reference value A (e.g., one hour) (step S12); if the difference Da is larger than the reference value A, the feature amount calculation unit 17 defines a time set backward by a predetermined time (e.g., one hour) from the location acquisition time t1 of the first location data, as the location acquisition time t2 of the second location data (step S13). Next, the feature amount calculation unit 17 determines whether the difference Db between the location acquisition times of the first and third location data is larger than the predetermined reference value B (e.g., one hour) (step S14); if the difference Db is larger than the reference value B, the feature amount calculation unit 17 defines a time set forward by a predetermined time (e.g., one hour) from the location acquisition time t1 of the first location data, as the location acquisition time t3 of the third location data (step S15). Then the feature amount calculation unit 17 calculates a difference between the location acquisition time t2 of the second location data and the location acquisition time t3 of the third location data, as a feature amount of the first location data (step S16). The above completes the processes in steps S4 and S5 for a piece of observation target location data (first location data).

Thereafter, the aforementioned processes in steps S4 and S5 are executed for each piece of the observation target location data, and the flow goes to step S7 after the execution of the processes is completed for all pieces of the observation target location data (with an affirmative judgment in step S6).

In step S7, the number-of-terminals estimation unit 18 estimates the number of terminals to be a numeral obtained by dividing the sum of the feature amounts $w_{ij}$ on the observation target location data by twice the length T of the observation period, as shown in the aforementioned Equation (6). As apparent from Equation (6), the number-of-terminals estimation unit 18 may estimate the number of terminals to be a numeral obtained by dividing each of the feature amounts $w_{ij}$ on the observation target location data by 2, calculating the sum of (feature amounts $w_{ij}/2$), and then dividing the obtained sum by the length T of the observation period. However, the number of divisions is overwhelmingly smaller in the calculation method of dividing the sum of the feature amounts $w_{ij}$ on the observation target location data by twice the length T of the observation period as in the present embodiment, which provides the advantage of reduction in processing load.

Furthermore, the number-of-terminals output unit 19 outputs the number of terminals obtained by the estimation (step S8).

Since the first embodiment described above involves performing the correction using the acquisition time information of the preceding and following location data in estimating the number of terminals using the location data, the number of terminals can be accurately estimated while correcting the influence of variation in reception intervals.

Since the processes in the case where the location acquisition time of the second or third location data is the abnormal value as described above are carried out in the calculation process of feature amount, when the acquisition time interval of location data becomes abnormally long because of the mobile terminal 100 being located in an out-of-service area or because of the mobile terminal 100 being in a power-off mode, it becomes feasible to prevent the abnormally long acquisition time interval from excessively affecting the calculation result.

[Second Embodiment]

The foregoing first embodiment described the example in which the location data of the target for calculation of the feature amount was narrowed down to the observation target location data, whereas the second embodiment below will describe an example in which the feature amounts are calculated for targets of all pieces of the acquired location data, i.e., example in which the feature amounts are preliminarily calculated for all pieces of the location data before execution of the number-of-terminals estimation and in which the number of terminals is estimated using the feature amounts of the observation target location data among them. The system configuration of the communication system in the second embodiment is the same as the system configuration in the first embodiment shown in FIG. 1, and therefore the description of the same system configuration is omitted herein.

Figure 7:
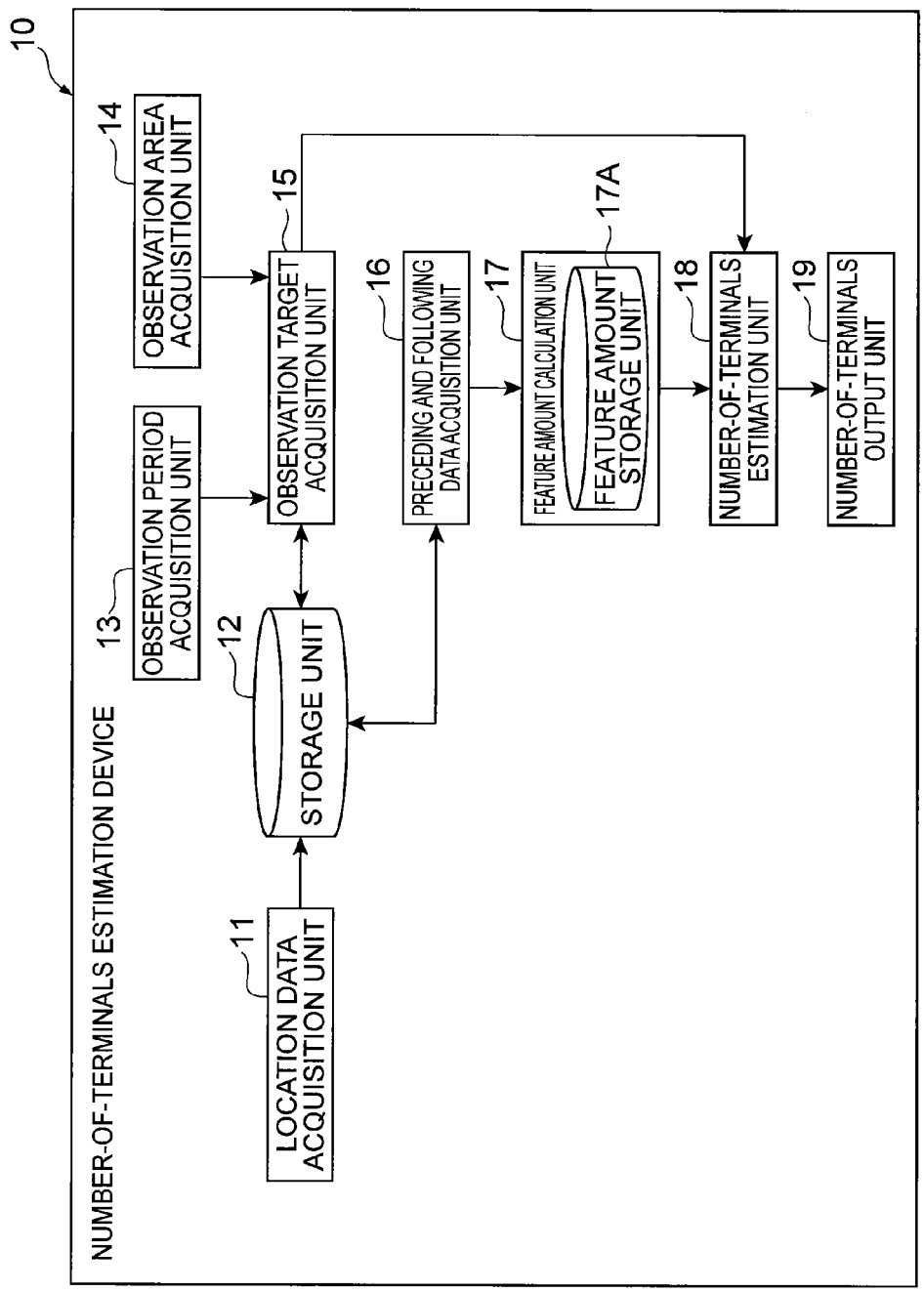
FIG. 7 is a drawing showing a configuration of a number-of-terminals estimation device in the second embodiment.

As shown in FIG. 7, the number-of-terminals estimation device 10 according to the second embodiment is provided with the same components as the number-of-terminals estimation device of the first embodiment (FIG. 2) and the functions of the respective components are much the same; therefore, it will be described with focus on differences from the number-of-terminals estimation device of the first embodiment.

The observation target acquisition unit 15 in the second embodiment acquires as the observation target location data, one or more pieces of location data including the location acquisition time information after the observation start time and before the observation end time about the observation period to be observed and including the location information associated with the observation area information about the observation area to be observed, and thereafter outputs the observation target location data to the number-of-terminals estimation unit 18.

The preceding and following location data acquisition unit 16 defines each of all pieces of the location data acquired by the location data acquisition unit 11, as the first location data and acquires the location acquisition time information of the second location data (immediately-preceding location data) and the third location data (immediately-following location data) about the first location data. The location data acquired by the location data acquisition unit 11 may be data stored in the storage unit 12 after acquired by the location data acquisition unit 11, or data transmitted from the location data acquisition unit 11 to the preceding and following location data acquisition unit 16, without being stored in the storage unit 12.

The feature amount calculation unit 17 defines each of all pieces of the location data acquired by the location data acquisition unit 11, as the first location data and calculates the feature amount of the first location data. Since the result of this calculation becomes a huge amount of data, the feature amount calculation unit 17 is preferably provided with a feature amount storage unit 17A for storage of feature amounts as the calculation result as shown in FIG. 7, and the feature amount storage unit 17A stores the feature amounts as the calculation result. The second embodiment is the same as the first embodiment in that the feature amount calculation unit 17 calculates the difference between the location acquisition times of the second and third location data as the feature amount of the first location data and in that the device performs the processes in the case where the location acquisition time of the second or third location data is an abnormal value as shown in FIG. 6.

The number-of-terminals estimation unit 18 extracts the feature amounts of the observation target location data received from the observation target acquisition unit 15, from the feature amounts of all pieces of location data preliminarily calculated and stored in the feature amount storage unit 17A, and estimates the number of terminals located in the observation area during the observation period, based on the feature amounts of the observation target location data and the difference between the observation start time and the observation end time (the length of the observation period). Specifically, as in the first embodiment, the number-of-terminals estimation unit 18 estimates the number of terminals to be a numeral obtained by dividing the sum of the feature amounts of the observation target location data by twice the length of the observation period.

The number-of-terminals estimation process in the second embodiment will be described below. It is assumed herein that the location information in the location data of each mobile terminal is a sector number of a sector in which the mobile terminal stays.

Figure 8:
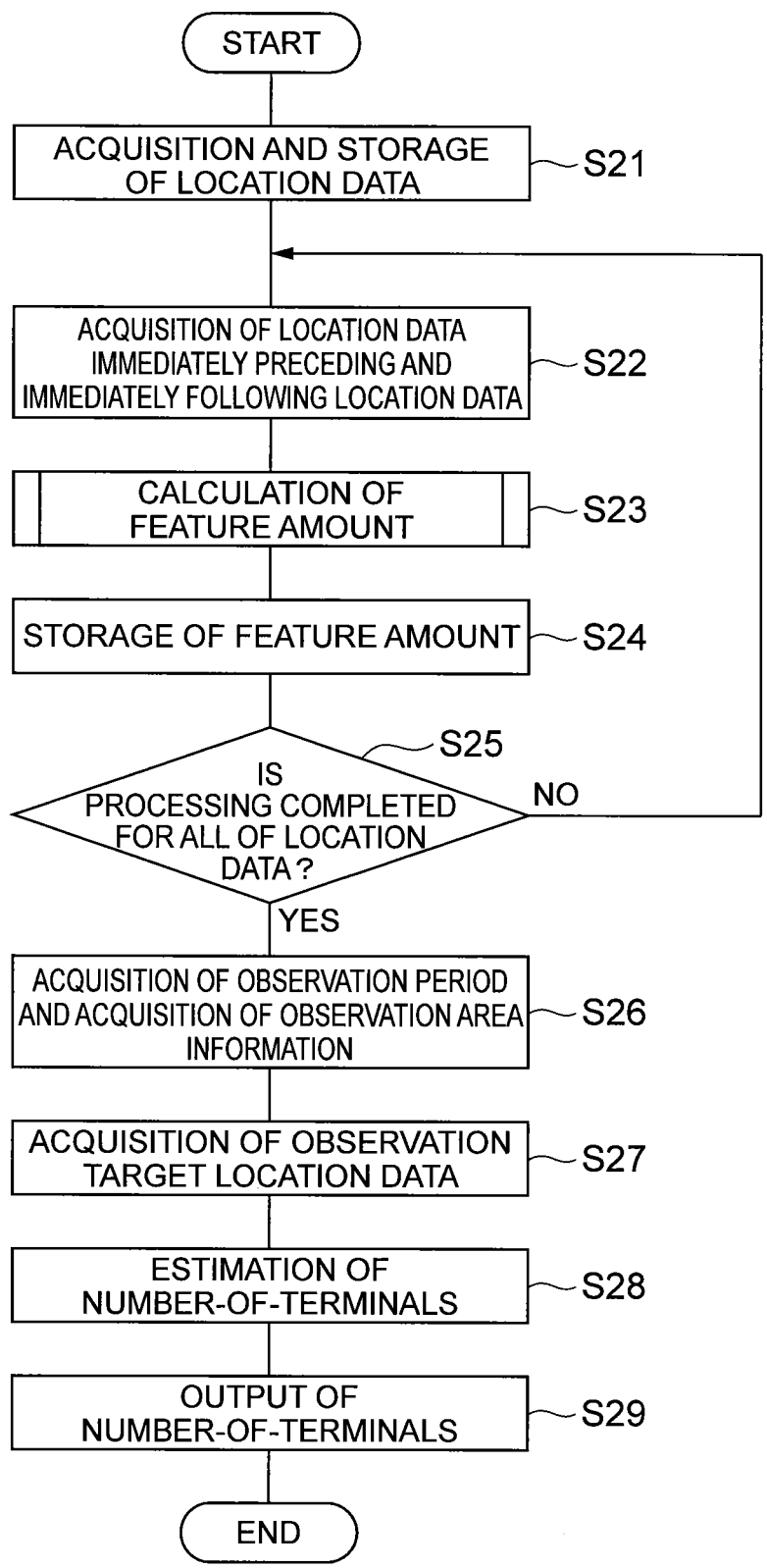
FIG. 8 is a flowchart showing a number-of-terminals estimation process in the second embodiment.

As shown in FIG. 8, first, the location data acquisition unit 11 acquires the location data from the outside and stores the location data into the storage unit 12 (step S21 in FIG. 8). However, the storage of the location data into the storage unit 12 is not indispensable, but the location data may be transmitted directly from the location data acquisition unit 11 to the preceding and following location data acquisition unit 16, followed by execution of below-described step S22. The processes in step S22 and subsequent steps may be executed with some time interval, after execution of the process in step S21.

Next, the processes in steps S22 to S24 below are carried out for each of all pieces of the location data acquired. In step S22, concerning a piece of location data (first location data) as a target for calculation of the feature amount, the preceding and following location data acquisition unit 16 acquires the location acquisition time information of the location data (second location data) immediately preceding the first location data and the location acquisition time information of the location data (third location data) immediately following the first location data in view of the location acquisition times, from the location data including the same identification information as that of the first location data. It is not essential for the preceding and following location data acquisition unit 16 to acquire the whole of the second and third location data, but it is sufficient for the preceding and following location data acquisition unit 16 to acquire the location acquisition time information in the second and third location data. Then in step S23, the feature amount calculation unit 17 calculates the feature amount of the first location data in accordance with the procedure shown in FIG. 6 which is the same as in the first embodiment. Since the process in step S23 is the same as the process in step S5 in the first embodiment described above, the description thereof is omitted herein. Thereafter, the feature amount obtained in step S23 is stored in the feature amount storage unit 17A (step S24).

The above completes the processes in steps S22-S24 on a piece of observation target location data (first location data). Thereafter, the processes in steps S22-S24 are executed for each of all pieces of the location data. After the processes in steps S22-S24 are completed for all pieces of the location data (with an affirmative judgment in step S25), the feature amounts of all pieces of the location data have been calculated and stored in the feature amount storage unit 17A. In this manner, the feature amounts of all pieces of the location data can be preliminarily calculated and stored before execution of the number-of-terminals estimation.

In next step S26, the observation period acquisition unit 13 acquires the observation period information including a set of an observation start time and an observation end time, and the observation area acquisition unit 14 acquires the observation area information associated with one or more pieces of location information. It is assumed herein that a set of observation start time T1 and observation end time T2 is acquired as the observation period information and that a sector number S is acquired as the observation area information.

Next, the observation target acquisition unit 15 acquires as the observation target location data, one or more pieces of location data including the location acquisition time information after the observation start time T1 and before the observation end time T2 and including the location information associated with the sector number S as the observation area information (e.g., the location information of which is the sector number S), from the storage unit 12 (step S27). Namely, the observation target acquisition unit 15 acquires the location data meeting the following conditions, as the observation target location data.

Condition 1: the location acquisition time is after the observation start time T1 and before the observation end time T2. Namely, the location acquisition time is within the observation period.

Condition 2: the location information is the sector S.

The acquisition of the observation target location data may be carried out as follows. Namely, the feature amount calculation unit 17 associates the feature amount obtained by the calculation, with the calculation target location data (the foregoing first location data) and stores the location data with the feature amount after associated, in the feature amount storage unit 17A. Then the number-of-terminals estimation unit 18 acquires the observation period information and the observation area information via the observation target acquisition unit 15, and retrieves the location data with the feature amount matching the conditions of the observation period and the observation area, from the feature amount storage unit 17A, to acquire the location data with the feature amount as the observation target location data.

Returning to FIG. 8, in next step S28 the number-of-terminals estimation unit 18 estimates the number of terminals to be a numeral obtained by dividing the sum of the feature amounts $w_{ij}$ on the observation target location data by twice the length T of the observation period, as shown in Equation (6) above. As apparent from Equation (6), the number-of-terminals estimation unit 18 may estimate the number of terminals to be a numeral obtained by dividing each of the feature amounts $w_{ij}$; on the observation target location data by 2, calculating the sum of (feature amounts $w_{ij}/2$), and dividing the obtained sum by the length T of the observation period. However, the number of divisions is overwhelmingly smaller in the calculation method of dividing the sum of the feature amounts $w_{ij}$ on the observation target location data by twice the length T of the observation period as in the present embodiment, and thus the calculation method in the present embodiment provides the advantage of reduction in processing load.

Furthermore, the number-of-terminals output unit 19 outputs the number of terminals obtained by the estimation (step S29).

The second embodiment described above involves performing the correction using the acquisition time information of the preceding and following location data in estimating the number of terminals using the location data, as in the first embodiment, whereby the number of terminals can be accurately estimated while correcting the influence of variation in reception intervals.

In particular, since the second embodiment involves calculating and storing the feature amounts of all pieces of location data in advance before the execution of the number-of-terminals estimation, the number-of-terminals estimation device has the advantage of reduction in time from the acquisition of the observation period information and the observation area information and the start of the number-of-terminals estimation process to the acquisition of the number of terminals as the estimation result.

In the processing of FIG. 8, it is not essential to execute the processes in steps S26-S27 after step S25, and the processes in steps S22 to S25 may be concurrently executed in parallel with the processes in steps S26-S27.

[Third Embodiment]

The third embodiment will describe the second technique about the number-of-terminals estimation and a feature amount calculation process based on the second technique. Since the configurations of the communication system and the number-of-terminals estimation device in the third embodiment are the same as in the first and second embodiments, the description thereof is omitted herein.

Figure 9:
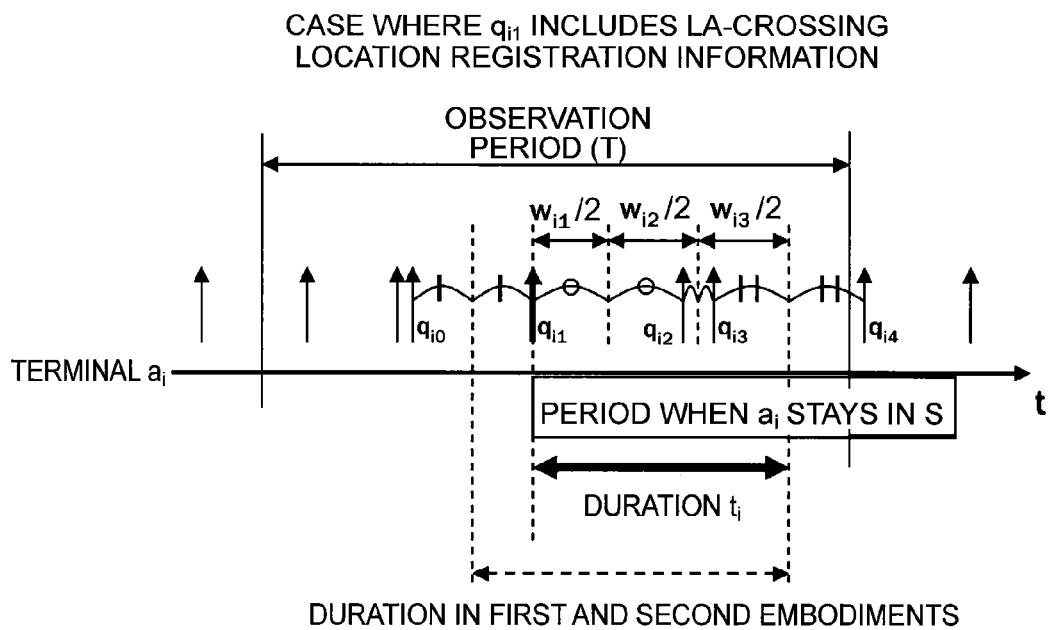
FIG. 9 is a drawing for explaining a second conception of number-of-terminals estimation.

FIG. 9 shows a drawing concerning the second conception of number-of-terminals estimation. In this FIG. 9, $q_{ij}$ represents the location data generated by terminal and among them, $q_{i1}$, $q_{i2}$, and $q_{i3}$ indicate the location data generated by terminal $a_i$ while staying in the sector S during the observation period. It is assumed herein that $q_{i1}$ includes location registration information generated due to a crossing of the terminal $a_i$ across a border of a location registration area (Location Area) (which will be referred to hereinafter as "LA-crossing location registration information"), and it will be referred to hereinafter as "LA-crossing location registration information $q_{i1}$." In this case, since it can be determined that the terminal $a_i$ entered the sector S at a time of generation of the LA-crossing location registration information $q_{i1}$, we can also establish another conception to define the feature amount with $w_{i1}$ on the LA-crossing location registration information $q_{i1}$, as a difference between the generation time of the LA-crossing location registration information $q_{i1}$ and the generation time of the immediately-following location data $q_{i2}$, instead of the difference between the generation time of the immediately-preceding location data $q_{i0}$ and the generation time of the immediately-following location data $q_{i2}$ as employed in the aforementioned first and second embodiments.

Based on this conception, the duration $t_i$ of period when the terminal $a_i$ stays in the sector S during the observation period is a duration indicated by a thick solid line in FIG. 9, which is shorter by (difference between the generation time of the LA-crossing location registration information $q_{i1}$ and the generation time of the immediately-preceding location data $q_{i0}/2$) than the duration $t_i$ in the first and second embodiments (the duration indicated by a dashed line in FIG. 9).

Figure 28:
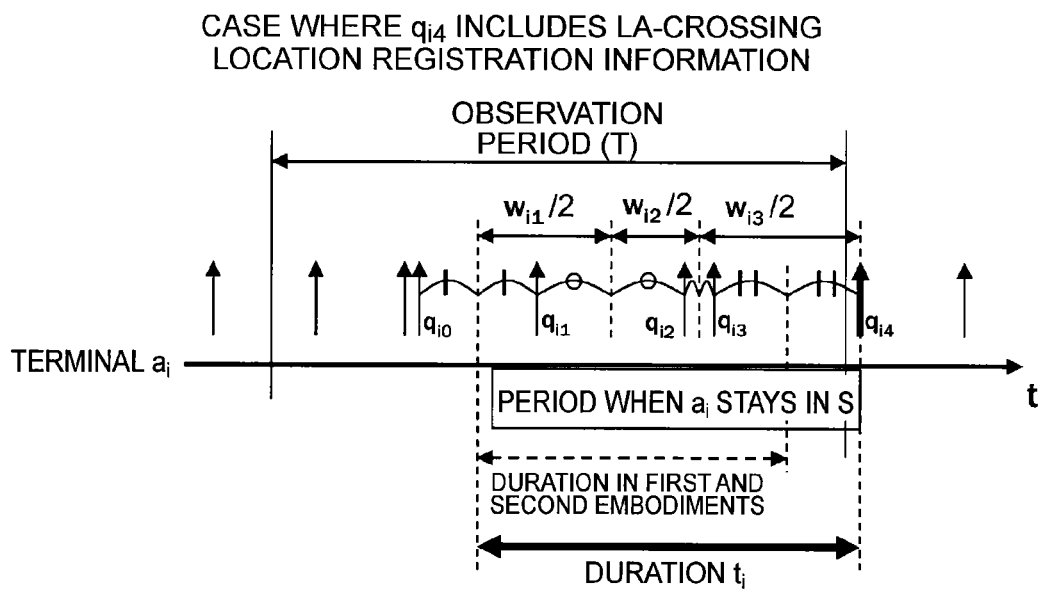
FIG. 28 is a drawing for explaining the second conception of number-of-terminals estimation.

Furthermore, as shown in FIG. 28, the location data $q_{i4}$ is assumed to include the LA-crossing location registration information and it will be referred to hereinafter as "LA-crossing location registration information $q_{i4}$." In this case, it can be determined that the terminal $a_i$ leaves the sector S at a time of generation of the LA-crossing location registration information $q_{i4}$. For this reason, when the feature amount $w_{i3}$ is calculated on the location data $q_{i3}$ immediately preceding the LA-crossing location registration information $q_{i4}$, the feature amount $w_{i3}$ on the location data $q_{i3}$ becomes longer by (difference between the generation time of the location data $q_{i3}$ and the generation time of the immediately-following LA-crossing location registration information $q_{i4}/2$). Namely, the duration $t_i$ of period when the terminal $a_i$ stays in the sector S during the observation period is a duration indicated by a thick solid line in FIG. 28, which is longer by (difference between the generation time of the location data $q_{i3}$ and the generation time of the immediately-following LA-crossing location registration information $q_{i4}/2$) than the duration $t_i$ in the first and second embodiments (the duration indicated by a dashed line in FIG. 28).

The feature amount calculation process based on the second conception of the number-of-terminals estimation as described above will be described using FIG. 10. The location data as a target for calculation of feature amount will be referred to hereinafter as "calculation target location data."

Figure 10:
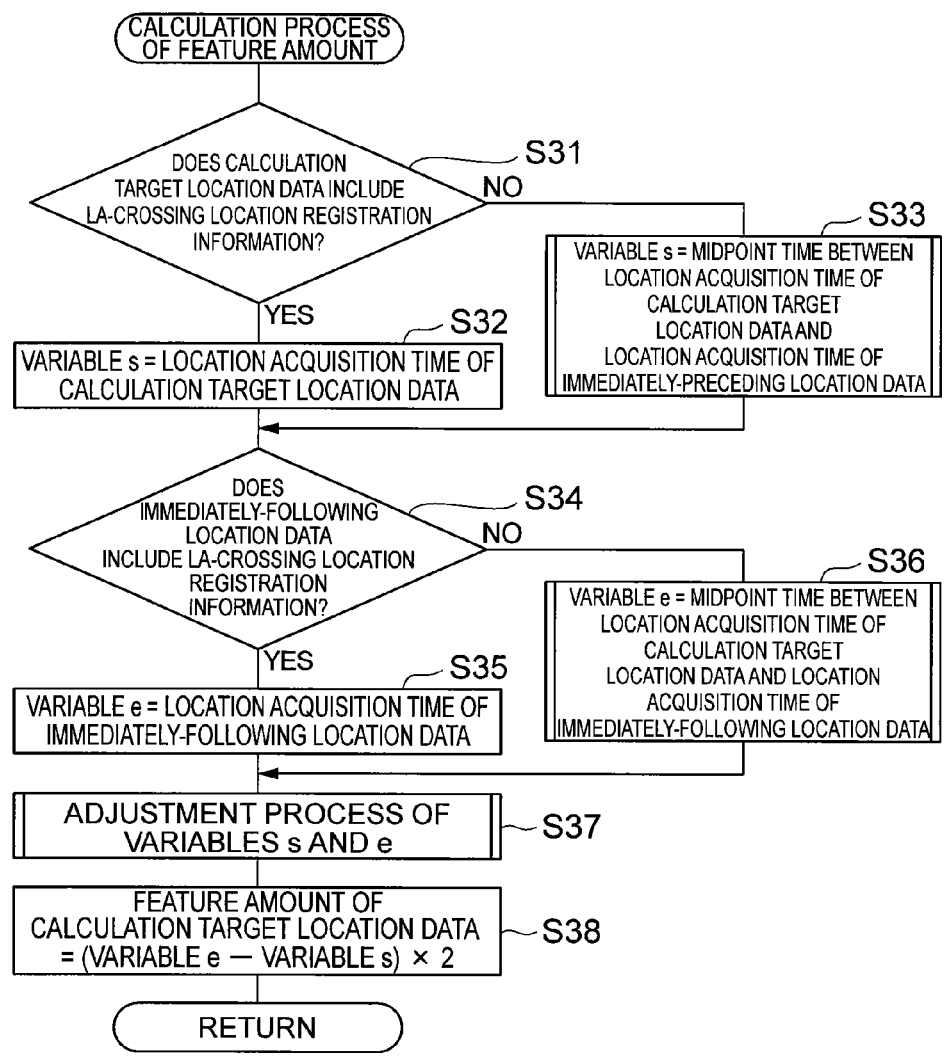
FIG. 10 is a flowchart showing a feature amount calculation process in the third embodiment.

As shown in FIG. 10, the feature amount calculation unit 17 first determines whether the calculation target location data includes the LA-crossing location registration information, for example, by service class information included in the calculation target location data (step S31). In this step, when the calculation target location data includes the LA-crossing location registration information, the feature amount calculation unit 17 sets the location acquisition time of the calculation target location data to a first variable s for calculation of feature amount (which will be referred to hereinafter as "variable s") (step S32); when the calculation target location data does not include the LA-crossing location registration information, the feature amount calculation unit 17 sets a midpoint time between the location acquisition time of the calculation target location data and the location acquisition time of the immediately-preceding location data to the variable s (step S33).

Next, the feature amount calculation unit 17 determines whether the immediately-following location data includes the LA-crossing location registration information, for example, by service class information included in the immediately-following location data (step S34). In this step, when the immediately-following location data includes the LA-crossing location registration information, the feature amount calculation unit 17 sets the location acquisition time of the immediately-following location data to a second variable e for calculation of feature amount (which will be referred to hereinafter as "variable e") (step S35); when the immediately-following location data does not include the LA-crossing location registration information, the feature amount calculation unit 17 sets a midpoint time between the location acquisition time of the calculation target location data and the location acquisition time of the immediately-following location data to the variable e (step S36). It is not essential to perform the determination processes in steps S31, S34 above on the basis of the service class information, but they may be performed based on other information. For example, it is also possible to adopt a scheme in which area information indicative of ranges of location registration areas is preliminarily retained and the determination processes are carried out based on the location information of the calculation target location data and the immediately-following location data, and the area information.

Figure 11:
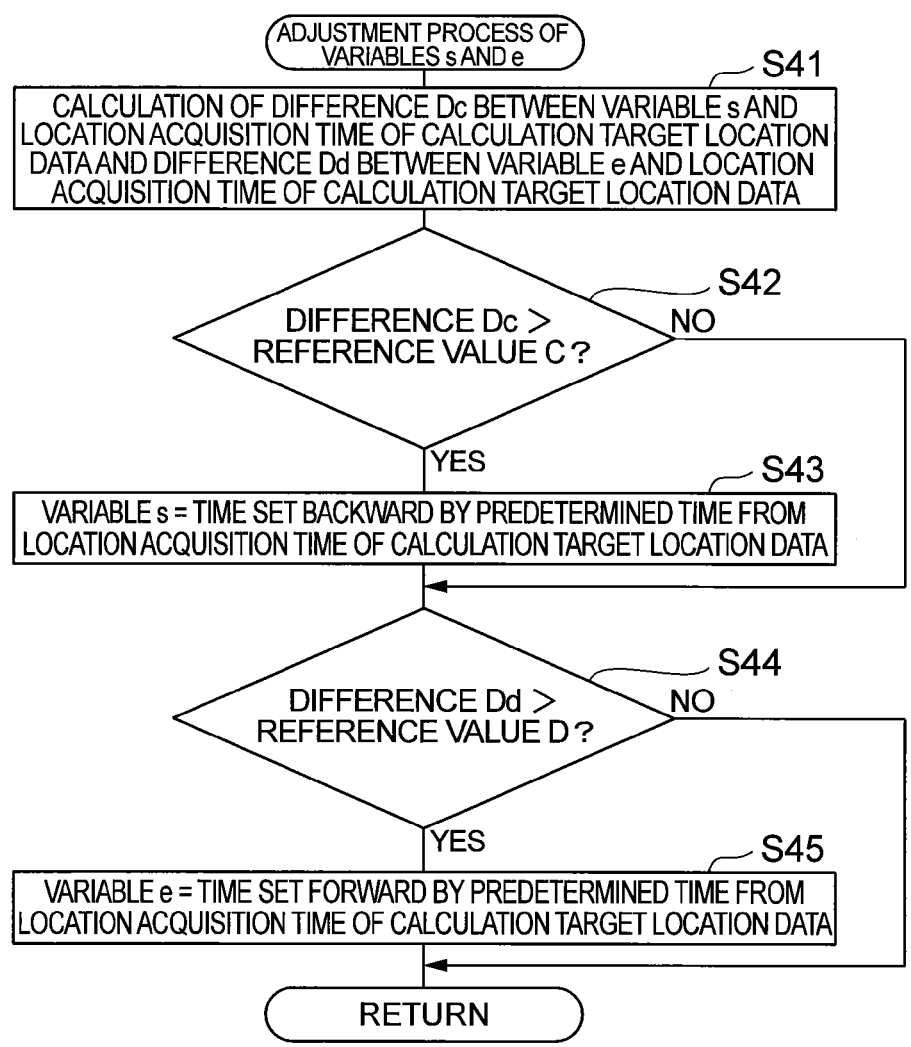
FIG. 11 is a flowchart showing an adjustment process of variables s and e.

Next, the feature amount calculation unit 17 performs an adjustment process of the variables s, e shown in FIG. 11 (step S37). It is assumed herein that the location acquisition time of the calculation target location data is t1, a reference value C (e.g., 0.5 hour) is defined as a predetermined reference value of a reference to determine that the variable s is an abnormal value, and a reference value D (e.g., 0.5 hour) is defined as a predetermined reference value of a reference to determine that the variable e is an abnormal value.

The feature amount calculation unit 17 calculates a difference Dc between the variable s and the time t1 and a difference Dd between the variable e and the time t1 (step S41 in FIG. 11). Then the feature amount calculation unit 17 determines whether the difference Dc between the variable s and the time t1 is larger than the predetermined reference value C (e.g., 0.5 hour) (step S42); if the difference Dc is larger than the reference value C, the feature amount calculation unit 17 sets a time set backward by a predetermined time (e.g., 0.5 hour) from the time t1, to the variable s (step S43). Next, the feature amount calculation unit 17 determines whether the difference Dd between the variable e and the time t1 is larger than the predetermined reference value D (e.g., 0.5 hour) (step S44); if the difference Dd is larger than the reference value D, the feature amount calculation unit 17 sets a time set forward by a predetermined time (e.g., 0.5 hour) from the time t1, to the variable e (step S45). By carrying out this adjustment process of the variables s, e, when the acquisition time interval of location data becomes abnormally long because of the mobile terminal 100 being located in an out-of-service area or because of the mobile terminal 100 being in a power-off mode, it is feasible to prevent the abnormally long acquisition time interval from excessively affecting the calculation result.

Next, returning to FIG. 10, the feature amount calculation unit 17 calculates a value of twice (variable e-variable s) as a feature amount of the calculation target location data (step S38). The feature amount of the calculation target location data is obtained through the above processing.

The third embodiment described above can obtain the feature amount with high accuracy while taking account of the point that when at least one of the calculation target location data and the immediately-following location data includes the LA-crossing location registration information, the entrance into the sector S or the exit from the sector S is determined to have occurred at the time of generation of the LA-crossing location registration information.

The feature amount calculation technique described in the third embodiment is also applicable to the case where the feature amounts are calculated by narrowing down the location data to the observation target location data and where the number of terminals is estimated by the feature amounts obtained, as in the first embodiment, and to the case where the feature amounts are preliminarily calculated for all pieces of the location data and where the number of terminals is estimated using the feature amounts of the observation target location data among them as in the second embodiment.

[Fourth Embodiment]

The fourth and fifth embodiments below will describe examples in which a population is estimated using a factor to convert the number of terminals obtained by the estimation, into a population (which will be referred to hereinafter as "scaling factor"). The fourth embodiment of them will describe an embodiment in which each feature amount is multiplied by the scaling factor and a population is determined using an aggregate value of results of the multiplication, and the fifth embodiment will describe an embodiment in which the feature amounts are totalized in respective population estimation units (e.g., in respective attributes or time zones), the aggregate values are multiplied by scaling factors according to the population estimation units, and populations are determined using the multiplication results.

The embodiments of the fourth embodiment and subsequent embodiments will be described based on the process of preliminarily calculating the feature amounts of all pieces of location data and estimating the population or the number of terminals using the feature amounts of the observation target location data among them. It is, however, noted that the embodiments are also applicable to the process of calculating the feature amounts of the narrowed observation target location data and estimating the population or the number of terminals using them.

Figure 12:
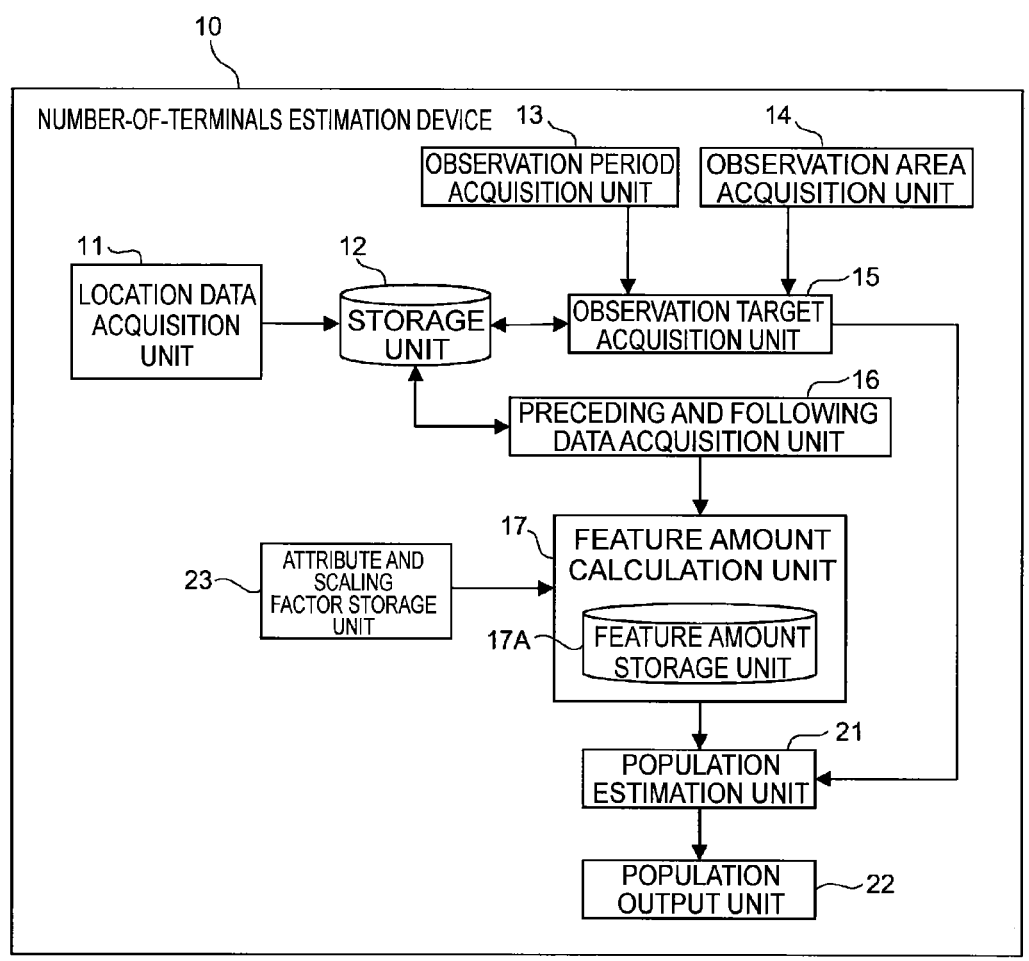
FIG. 12 is a drawing showing a configuration of a number-of-terminals estimation device in the fourth embodiment.

As shown in FIG. 12, the function block configuration of the number-of-terminals estimation device 10 in the fourth embodiment is different in below-described points from the function block configuration of the number-of-terminals estimation device in the second embodiment (FIG. 7), and thus the different points will be described below. The number-of-terminals estimation device 10 is provided with a population estimation unit 21 to estimate a population on the basis of the feature amounts, instead of the number-of-terminals estimation unit 18, and is provided with a population output unit 22 to output the estimated value by the population estimation unit 21, instead of the number-of-terminals output unit 19. However, the "number-of-terminals estimation means" in the scope of claims corresponds to the number-of-terminals estimation unit 18 and the population estimation unit 21, and the "output means" to the number-of-terminals output unit 19 and the population output unit 22.

Furthermore, the number-of-terminals estimation device 10 is provided with an attribute and scaling factor storage unit 23 (scaling factor storage means) storing attribute information of each mobile terminal user and scaling factors for respective attributes preliminarily obtained. Using the user identification information of location data (e.g., hashed phone number) as key, the feature amount calculation unit 17 retrieves the attribute information of user and the scaling factor about the attribute information from the attribute and scaling factor storage unit 23, associates the location data with the calculated feature amount and the retrieved attribute information and scaling factor, and stores the location data after associated, into the feature amount storage unit 17A.

Next, the processing by the number-of-terminals estimation device 10 in the fourth embodiment will be described using FIG. 13. The processing in the fourth embodiment shown in FIG. 13 is different in below-described points from the processing in the second embodiment (FIG. 8) and thus the different points will be described below.

Figure 13:
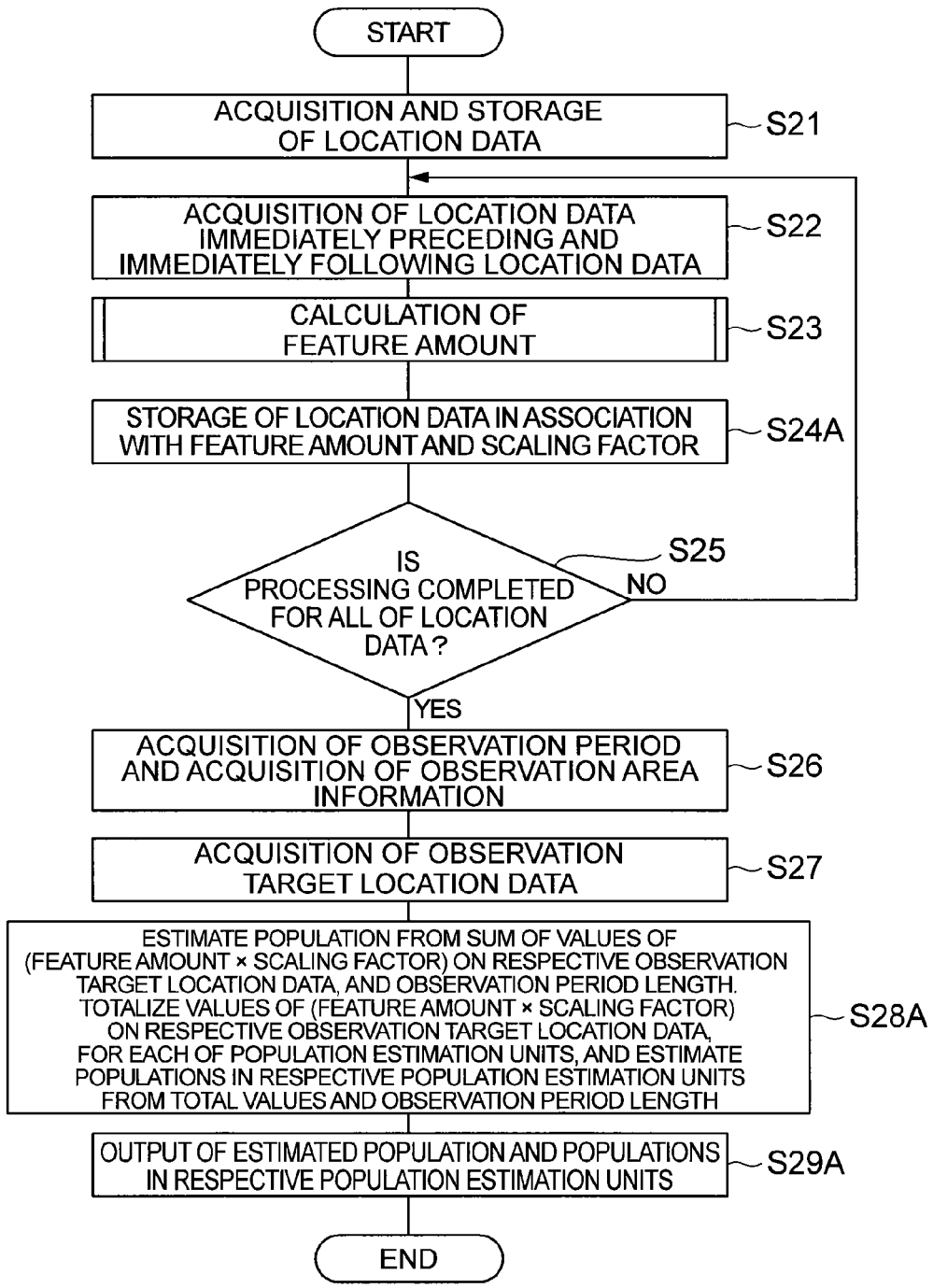
FIG. 13 is a flowchart showing a population estimation process in the fourth embodiment.

As shown in FIG. 13, after execution of the feature amount calculation process in step S23, step S24A is carried out as follows: using the user identification information of location data (e.g., hashed phone number) as key, the feature amount calculation unit 17 retrieves the attribute information of user and the scaling factor about the attribute information from the attribute and scaling factor storage unit 23, associates the location data with the calculated feature amount and the retrieved attribute information and scaling factor, and stores the location data after associated, into the feature amount storage unit 17A. The processes in steps S22 to S24A in FIG. 13 are carried out in order on all pieces of the location data, whereby the location data in association with the respective feature amounts and with the respective attribute information and scaling factors is stored in the feature amount storage unit 17A.

Thereafter, step S26 is carried out to acquire the observation period information and the observation area information, and in step S27 thereafter, the population estimation unit 21 receives the observation period information and the observation area information via the observation target acquisition unit 15 and acquires the location data meeting the conditions of the observation period information and the observation area information (i.e., the observation target location data) from the feature amount storage unit 17A. Then in step S28A the population estimation unit 21 multiplies the feature amounts of the respective pieces of observation target location data by the scaling factors and estimates a population in the observation area during the observation period to be a value obtained by dividing the sum of the obtained multiplication results by (observation length×2). Furthermore, the population estimation unit 21 totalizes the above multiplication results on the respective pieces of observation target location data on an attribute-by-attribute basis, based on the attribute information associated with the respective pieces of observation target location data and the acquisition time information in the respective pieces of observation target location data, and estimates populations in respective attributes to be values obtained by dividing the total values by (observation length×2). The example of estimating the populations in respective attributes was described herein, but the units of estimation of populations do not have to be limited to the attributes, and may be places, time zones, or the like. These estimation units (attributes, places, time zones, etc.) will be called below "population estimation units."

Furthermore, in next step S29A the population output unit 22 outputs the population in the observation area during the observation period and the populations in the respective population estimation units, which were obtained by the estimation in step S28A. In this step, for example as shown in FIG. 16, the population output unit 22 can output a population estimated on an observation area (represented by "estimated population" in FIG. 16), and populations in respective attributes such as genders, age groups, and addresses. It is also possible to adopt a combinational condition of multiple attributes (e.g., a condition of "women residing in Tokyo" as a combination of a gender and an address). The output herein includes a variety of output forms such as display output, voice output, and print output.

The fourth embodiment described above allows the device to obtain the population in the observation area during the observation period and the populations in respective population estimation units (e.g., attributes or time zones).

The foregoing steps S28A, S29A showed the example to estimate and output both of the population in the observation area during the observation period and the populations in respective population estimation units, but it should be noted that the estimation and output of the both is not essential and that it is also possible to estimate and output one of them.

The fourth embodiment described the example in which the scaling factors were preliminarily obtained, but the scaling factors may be acquired as follows. An scaling factor to be used herein as an example can be a reciprocal of a product of a presence rate and a penetration rate of terminal (i.e., a ratio of a presence count to a population). The "presence rate" herein means a rate of a presence count to the number of subscriptions, and the "penetration rate" a rate of the number of subscriptions to a population. It is preferable to derive such an scaling factor in each of the aforementioned scaling factor calculation units, but it is not essential. The scaling factors may be derived, for example, using the number of terminals (presence count) estimated based on the feature amounts and the length of the observation period as described below. The feature amounts are determined from the location data by the techniques as described in the first to third embodiments, the numbers of terminals in respective scaling factor calculation units are totalized based on the feature amounts and the length of the observation period to obtain user count pyramid data, and population pyramid data in the same scaling factor calculation units preliminarily obtained as statistical data (e.g., The Basic Resident Register or the like) is acquired. Then an acquisition rate of location data in each of the scaling factor calculation units (i.e., presence count/population in each unit) is calculated with the user count pyramid data and the population pyramid data. The "acquisition rate of location data (i.e., presence count/population)" corresponds to the aforementioned "product of a presence rate and a penetration rate of terminal." Reciprocals of the "acquisition rates of location data" obtained in this manner can be derived as the scaling factors. The scaling factor calculation units for calculation of the scaling factors to be adopted herein may be, for example, prefectures of addresses, age groups at intervals of five years or ten years, genders, one-hour zones as time zones, and so on, or may be a combination of two or more of them. For example, when an scaling factor calculation unit is "men in their twenties residing in Tokyo," the location data corresponding to men in their twenties residing in Tokyo (i.e., address information in user attributes of which is Tokyo) is extracted in the whole of Japan and the number of terminals is counted to obtain user count pyramid data, and the population pyramid data about men in their twenties residing in Tokyo is acquired from the statistical data. In the acquisition of the above user count pyramid data, the condition of "residing in Tokyo" is not to extract only the location data of users residing in Tokyo, but to extract the location data the address information in user attributes of which is Tokyo. Then an acquisition rate of location data (i.e., presence count/population) in the scaling factor calculation unit (men in their twenties residing in Tokyo herein) is calculated from the user count pyramid data and the population pyramid data, and a reciprocal of the "acquisition rate of location data" thus obtained can be derived as an scaling factor. In the present specification the scaling factor calculation units are described as equal to the population estimation units, but this is just an example, without need for being limited to this example.

The fourth embodiment described the process of obtaining the population on the basis of the second embodiment, but the fourth embodiment is also applicable to the aforementioned first and third embodiments.

[Fifth Embodiment]

The fifth embodiment will describe an embodiment in which the feature amounts are totalized in respective population estimation units (e.g., respective attributes or time zones) and the total values are multiplied by scaling factors according to the respective population estimation units to obtain populations.

Figure 14:
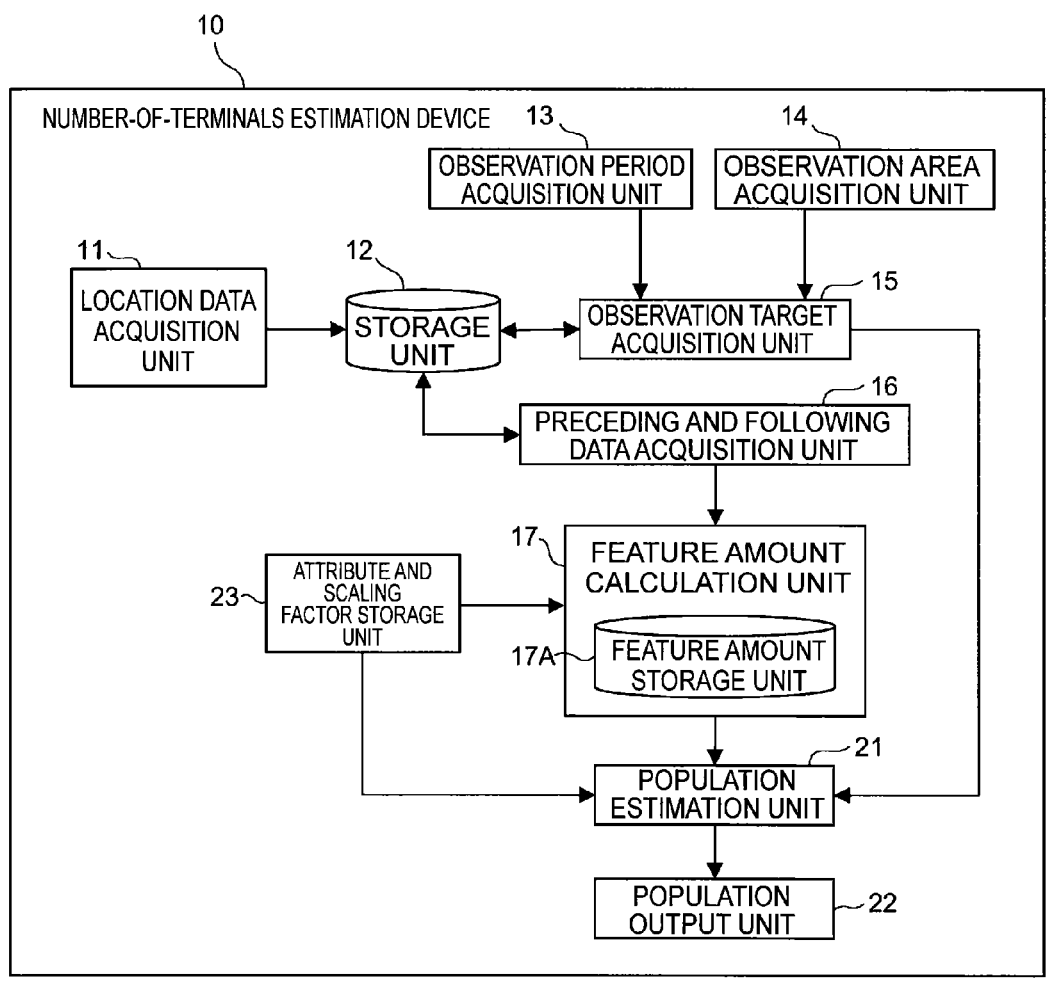
FIG. 14 is a drawing showing a configuration of a number-of-terminals estimation device in the fifth embodiment.

As shown in FIG. 14, the function block configuration of the number-of-terminals estimation device 10 in the fifth embodiment is similar to that of the number-of-terminals estimation device in the aforementioned fourth embodiment (FIG. 12), but the present embodiment is different from the fourth embodiment in that, instead of the feature amount calculation unit 17, the population estimation unit 21 retrieves the scaling factors from the attribute and scaling factor storage unit 23 and estimates the population through the use of the scaling factors. Namely, the processes by the feature amount calculation unit 17 and the population estimation unit 21 are different from those in the fourth embodiment, and the differences will be described using FIG. 15.

Figure 15:
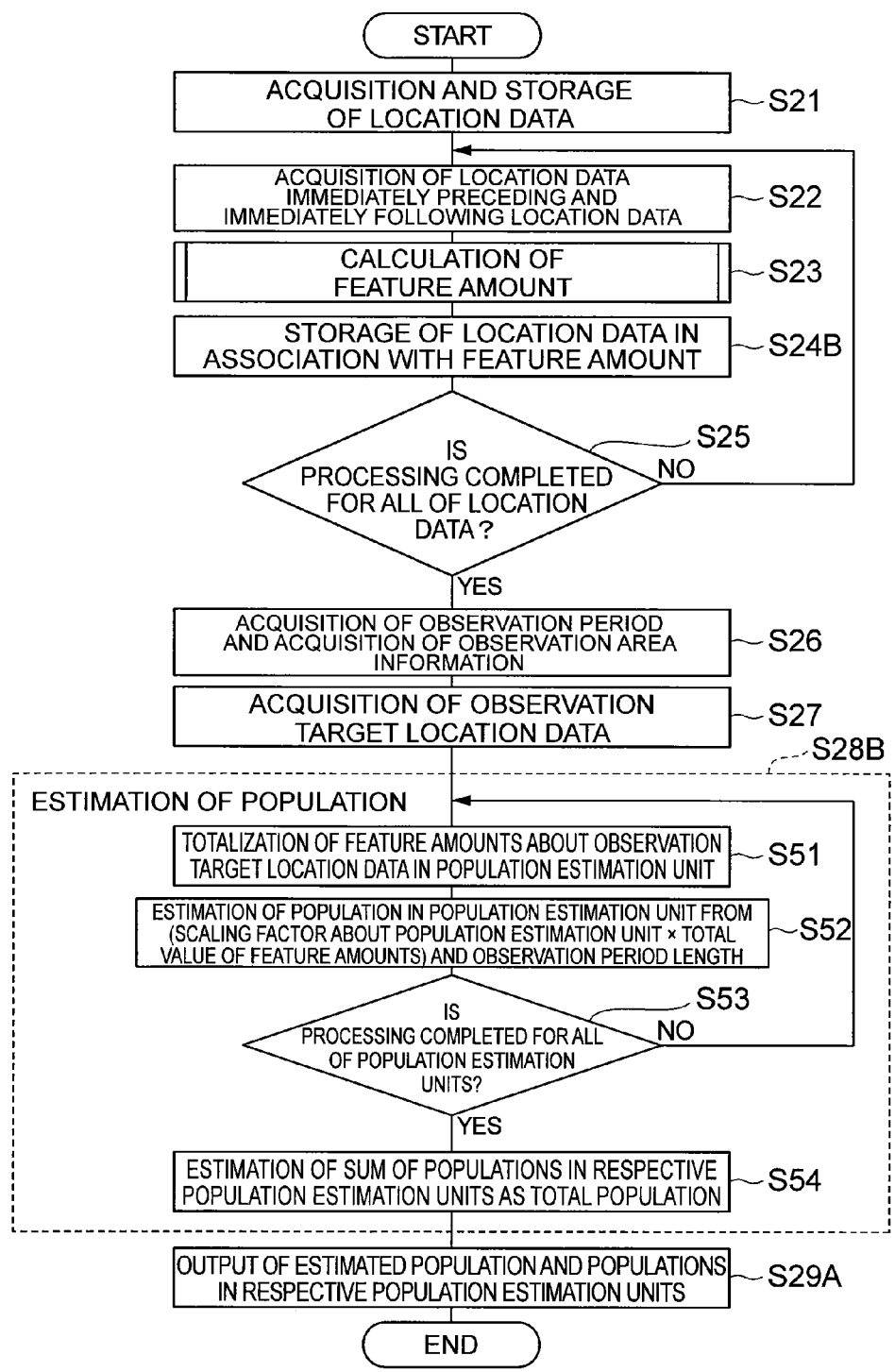
FIG. 15 is a flowchart showing a population estimation process in the fifth embodiment.

As shown in FIG. 15, after execution of the feature amount calculation process in step S23, step S24B is carried out as follows: the feature amount calculation unit 17 specifies attribute information of a user of location data from the location data with the use of the user identification information (e.g., hashed phone number) as key, retrieves the attribute information from the attribute and scaling factor storage unit 23, associates the location data with the calculated feature amount and the retrieved attribute information, and stores the location data after associated, in the feature amount storage unit 17A. The processes in steps S22 to S24B in FIG. 15 are executed in order on all pieces of location data, whereby the location data associated with the respective feature amounts and attribute information is stored in the feature amount storage unit 17A.

Thereafter, step S26 is carried out to acquire the observation period information and the observation area information, and thereafter in step S27 the population estimation unit 21 acquires the location data meeting the conditions of the observation period information and the observation area information (i.e., the observation target location data) from the feature amount storage unit 17A. Then in step S28B the population estimation unit 21 performs the population estimation process using the scaling factor as described below.

First, the population estimation unit 21 specifies the observation target location data meeting a condition of a population estimation unit (attribute or time zone), out of the acquired observation target location data, totalizes the feature amounts of the specified observation target location data (step S51), retrieves the scaling factor about the population estimation unit from the attribute and scaling factor storage unit 23, multiplies the feature amount total value by the scaling factor, and estimates a population in the population estimation unit to be a value obtained by dividing the multiplication result (scaling factor×feature amount total value) by (observation period length×2) (step S52). Then the above steps S51 to S52 are executed for each of population estimation units and, after completion of execution for all the population estimation units, the flow goes to step S54. At this point, populations in the respective population estimation units are obtained as the estimation result. Furthermore, the populations in the respective population estimation units are summed up and the sum is estimated as a population in the observation area during the observation period (step S54).

The above step S28B results in obtaining the population in the observation area during the observation period and the populations in the respective population estimation units. Then, in the next step S29A the population output unit 22 outputs the population in the observation area during the observation period and the populations in the respective population estimation units, which were obtained by the estimation in step S28B.

The fifth embodiment as described above allows the device to obtain the population estimated on the observation area (represented by "estimated population" in FIG. 16) and the populations in the respective population estimation units such as attributes or time zones, for example, as shown in FIG. 16.

As in the case of the fourth embodiment, steps S28A and S29 showed the example in which both of the population in the observation area during the observation period and the populations in the respective population estimation units were estimated and output, but it should be noted that the estimation and output of both is not essential and that it is also possible to estimate and output one of them. The fifth embodiment described the process to obtain the population on the basis of the second embodiment, but the fifth embodiment is also applicable to the aforementioned first and third embodiments.

[Sixth Embodiment]

The sixth and seventh embodiments below will describe examples in which estimated values (populations or the numbers of terminals) in respective areas of totalization units are converted into estimated values in respective output units (meshes as an example herein). The sixth embodiment of them will describe the processing in an environment in which there are communication regions of outdoor stations using a single frequency band, whereas the seventh embodiment will describe the processing in an environment in which there are two or more geographically overlapping communication regions out of communication regions of indoor stations and communication regions of outdoor stations using respective frequency bands with different coverage areas. When the output units are the same as the totalization units, the conversion processes described in the sixth and seventh embodiments below are not needed.

The sixth embodiment will describe the number-of-terminals estimation device and processing thereof in which the conversion function into estimated values in respective meshes is added to the number-of-terminals estimation device to estimate the population according to the fourth embodiment.

Figure 17:
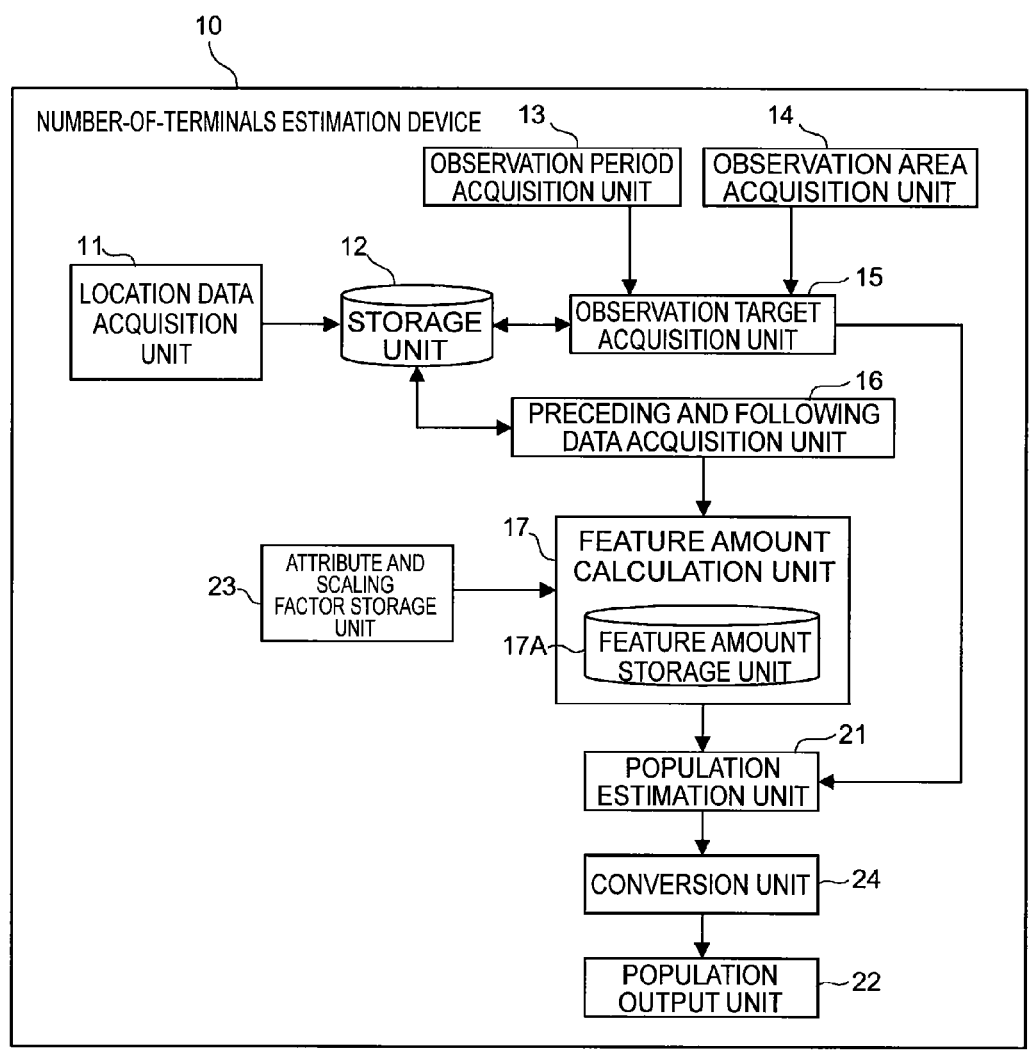
FIG. 17 is a drawing showing a configuration of a number-of-terminals estimation device in the sixth embodiment.

As shown in FIG. 17, the function block configuration of the number-of-terminals estimation device 10 in the sixth embodiment is a configuration in which a conversion unit 24 (conversion means) is added between the population estimation unit 21 and the population output unit 22 in the function block configuration of the number-of-terminals estimation device in the fourth embodiment (FIG. 12). The conversion unit 24 converts the populations in respective areas acquired by the estimation by the population estimation unit 21, into populations in respective meshes by below-described processing.

The processing of the conversion unit 24 will be described below in detail on the basis of FIG. 18. Part (a) of FIG. 18 is a drawing showing area ranges of respective areas, part (b) of FIG. 18 a drawing showing meshes, and part (c) of FIG. 18 a composite chart as a combination of the areas and the meshes.

Figure 19:
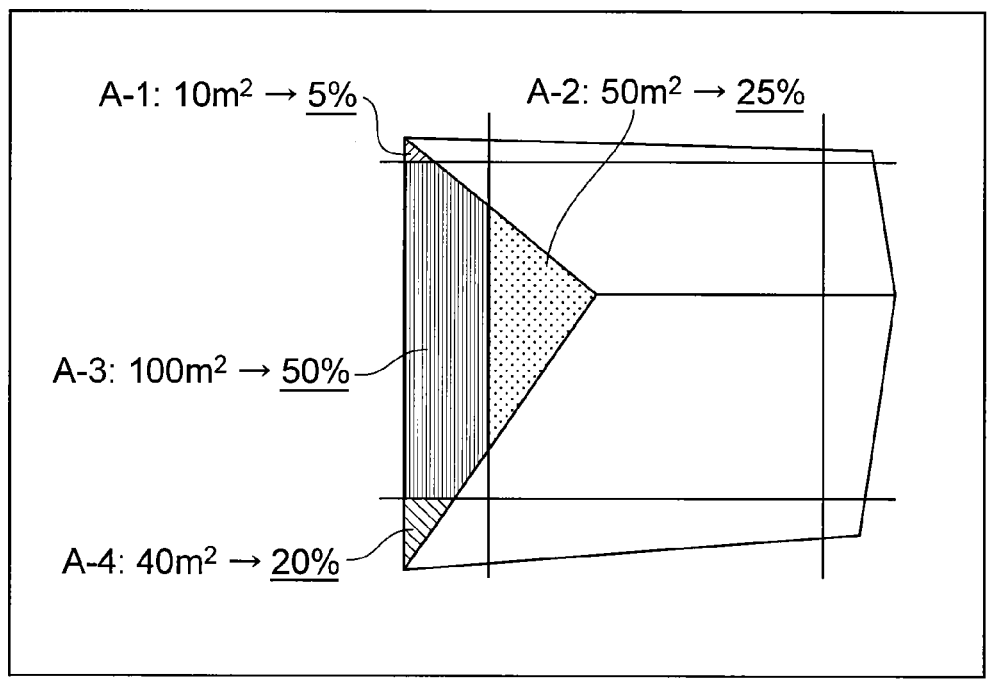
FIG. 19 is a drawing for explaining calculation of areas and area ratios of respective divided areas.

The conversion unit 24 combines an area map (cf. (a) of FIG. 18) reproduced based on preliminarily-stored area border information, with two-dimensional meshes (cf. (b) of FIG. 18) reproduced based on a predetermined division rule, to obtain the composite chart as shown in (c) of FIG. 18. Next, the conversion unit 24 divides each area by mesh borders in the foregoing composite chart. For example, as shown in FIG. 19, area A in (a) of FIG. 18 is divided into four divided areas A-1, A-2, A-3, and A-4 by mesh borders. Then the conversion unit 24 calculates the areas of the respective divided areas and calculates area ratios of the respective divided areas. For example, as shown in FIG. 19, supposing that the areas of the divided areas A-1, A-2, A-3, and A-4 are calculated as 10 m$^2$, 50 m$^2$, 100 m$^2$, and 40 m$^2$, respectively, the area ratios (e.g., percentages) of the respective divided areas A-1, A-2, A-3, and A-4 are calculated as 5%, 25%, 50%, and 20%.

It is not indispensable for the conversion unit 24 to calculate the area ratios of the respective divided areas. It is possible, for example, to adopt a configuration in which the area ratios of the respective divided areas are preliminarily determined and in which the conversion unit 24 can retrieve the information on the area ratios of the respective divided areas with reference to an unrepresented table in the number-of-terminals estimation device 10 or from the outside.

Figure 20:
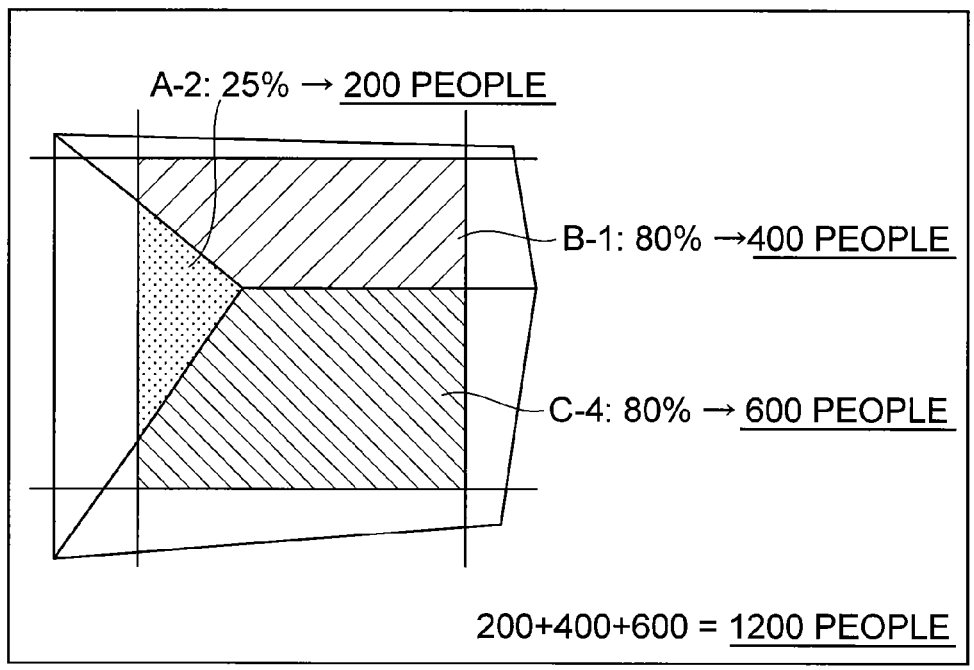
FIG. 20 is a drawing for explaining calculation of the sum of populations in divided areas in a certain mesh.

Next, the conversion unit 24 calculates populations in the respective divided areas. For example, supposing that a population in area A in (a) of FIG. 18 is 800, a population in the divided area A-2 is calculated as 200 (i.e., 800×25%) as shown in FIG. 20. Similarly, supposing that populations in the areas B and C are 500 and 750, a population in the divided area B-1 with the area ratio of 80% in the area B is calculated as 400 (i.e., 500×80%) and a population in the divided area C-4 with the area ratio of 80% in the area C is calculated as 600 (i.e., 750×80%).

Furthermore, the conversion unit 24 calculates the sum of the populations in the plurality of divided areas included in one mesh to calculate a population in the mesh. In the example of FIG. 20, the conversion unit 24 calculates a total of the populations in the divided areas A-2, B-1, and C-4 included in one mesh as 1200 (i.e., 200+400+600) and defines this 1200 as a population in the mesh.

As described above, the populations in respective totalization units can be converted into populations in respective output units, in the environment in which there are communication regions of outdoor stations using a single frequency band.

The sixth embodiment described the processing to convert the populations in respective totalization units into populations in respective output units on the basis of the fourth embodiment, but the sixth embodiment is also applicable to the aforementioned fifth embodiment. Furthermore, the conversion process described in the sixth embodiment is also applicable to cases where the numbers of terminals in respective totalization units are converted into the numbers of terminals in respective output units, and application thereof to the aforementioned first to third embodiments allows the numbers of terminals in respective totalization units to be converted into the numbers of terminals in respective output units.

[Seventh Embodiment]

The seventh embodiment will describe an example in which estimated values (numbers of terminals or populations) in respective areas (sectors) of totalization units are converted into estimated values in respective output units (meshes as an example herein), in an environment where there are at least two geographically overlapping communication regions out of communication regions of indoor stations and communication regions of outdoor stations using respective frequency bands with different coverage areas.

The function block configuration of the number-of-terminals estimation device in the seventh embodiment is the same as in the sixth embodiment, except for the processing of the conversion unit 24, and therefore the processing of the conversion unit 24 will be described on the basis of FIGS. 21 and 22.

Figure 21:
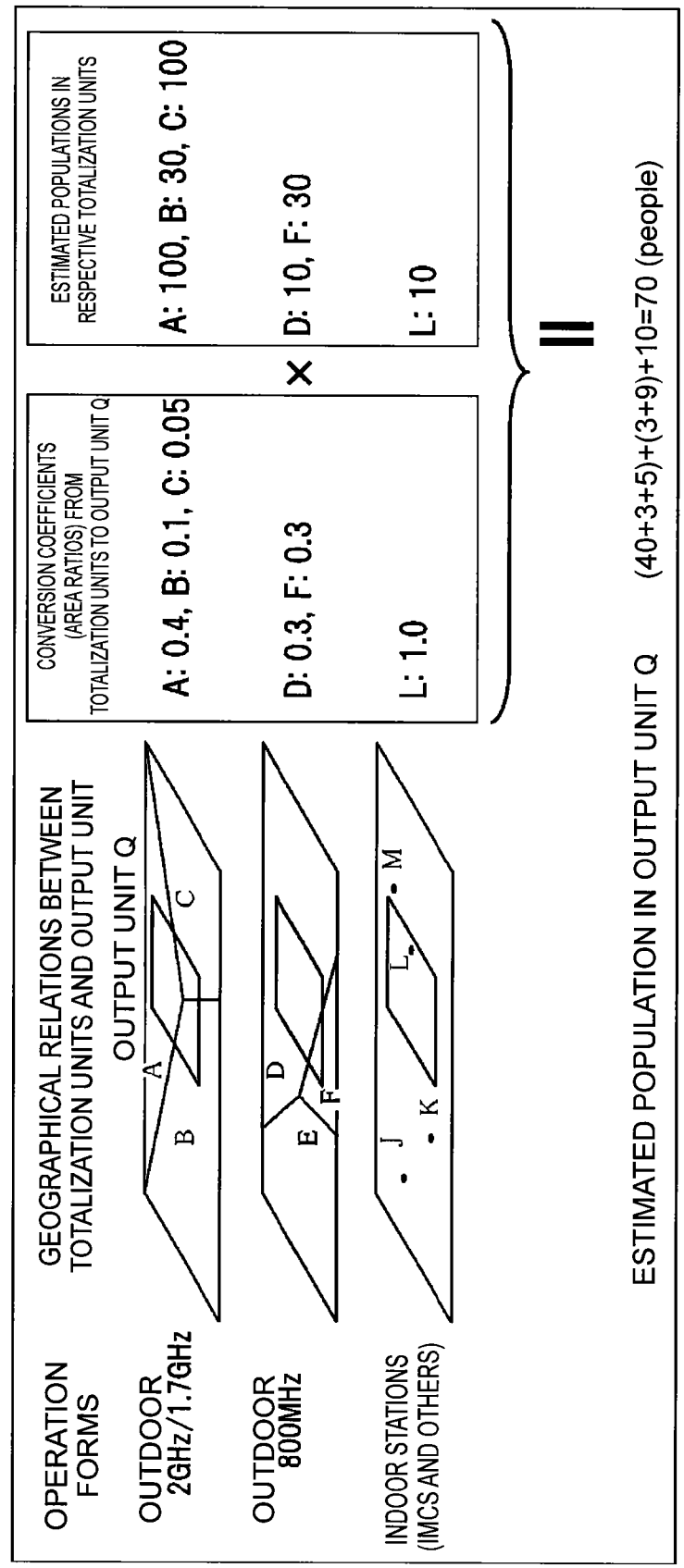
FIG. 21 is a drawing for explaining an estimated value conversion process in the seventh embodiment.

In an environment where there are geographically overlapping communication regions of communication regions of indoor stations and communication regions of outdoor stations using respective frequency bands with different coverage areas (outdoor 2 GHz/1.7 GHz and outdoor 800 MHz), as shown in FIG. 21, the conversion unit 24 performs the conversion process described in the sixth embodiment, for each of the communication regions, to obtain populations in respective output units (meshes) about the respective communication regions, and finally totalizes the populations about the respective communication regions in each of output units to obtain populations in respective output units.

In the example of FIG. 21, the conversion unit 24 first performs the conversion process described in the sixth embodiment, for each of the communication regions of the outdoor stations using outdoor 2 GHz/1.7 GHz, the communication regions of the outdoor stations using outdoor 800 MHz, and the communication regions of the indoor stations. For example, in the communication regions of the outdoor stations using outdoor 2 GHz/1.7 GHz, supposing that a divided area as an overlap between output unit Q and area A has an area ratio of 40% to the entire area of area A, an estimated population of 100 in area A is multiplied by the area ratio of 0.4 to obtain an estimated population of 40 for the divided area as an overlap between output unit Q and area A. Similarly, an estimated population of 3 is obtained for a divided area as an overlap between output unit Q and area B (estimated population of 30 in area B×area ratio of 0.1), and an estimated population of 5 is obtained for a divided area as an overlap between output unit Q and area C (estimated population of 100 in area C×area ratio of 0.05). Concerning the communication regions of the outdoor stations using outdoor 800 MHz, similarly, an estimated population of 3 is obtained for a divided area as an overlap between output unit Q and area D (estimated population of 10 in area D×area ratio of 0.3), and an estimated population of 9 is obtained for a divided area as an overlap between output unit Q and area F (estimated population of 30 in area F×area ratio of 0.3). On the other hand, concerning the indoor stations, the areas of the individual indoor stations as coverage areas are very small, and in the example of FIG. 21, the whole of area L of one indoor station overlaps the output unit Q; therefore, the area ratio can be considered to be 100%. Therefore, an estimated population of 10 in area L is multiplied by the area ratio 1.0 to obtain an estimated population of 10 for the area as an overlap between output unit Q and area L (the whole of area L in this example).

Finally, the conversion unit 24 totalizes the estimated populations of the overlapping areas between output unit Q and each of the areas, which were obtained as described above, to obtain an estimated population of 70 in output unit Q. In the manner as described above, the populations in the respective totalization units can be converted into the estimated population in output unit Q.

FIG. 21 shows the conversion into the estimated population in one output unit Q, but the same process may be executed for other output units to implement the conversion into estimated populations in all output units as targets.

FIG. 22 shows a matrix equation for conversion into estimated populations in n output units as targets. Namely, in the right-hand side of the equation of FIG. 22, the following components:

$$Pop_{b_j}$$

(where j is an integer of not less than 1 and not more than m (m is the number of totalization units overlapping any one of n output units as targets)) mean populations (estimated populations) in respective totalization units obtained by estimation; in the left-hand side, the following components:

$$Pop_{a_i}$$

(where i is an integer of not less than 1 and not more than n) mean populations in respective output units; in the right-hand side of the matrix equation, the following components:

$$k_{b_j \to a_i}$$

mean conversion coefficients for conversion from populations in totalization units $b_j$ into populations in output units $a_i$. The conversion coefficients herein correspond to the aforementioned area ratios of divided areas to the entire original area.

Each of the conversion coefficients in FIG. 22 can be preliminarily determined from a positional relation between estimation units (e.g., areas) and output units (e.g., meshes); when each of the conversion coefficients is preliminarily determined and the equation of FIG. 22 is stored, populations (estimated populations) in respective totalization units obtained by estimation can be readily and quickly converted into populations in respective output units, using the equation of FIG. 22.

In the manner as described above, the populations in respective totalization units can be converted into populations in respective output units, even in the environment where there are at least two geographically overlapping communication regions out of communication regions of indoor stations and communication regions of outdoor stations using respective frequency bands with different coverage areas.

The sixth and seventh embodiments described the examples in which the populations in the respective totalization units preliminarily obtained by estimation were converted into populations in respective output units, but the following modification examples can also be contemplated.

Together with the feature amounts and scaling factors, at least one combination of output unit IDs about respective output units geographically overlapping with areas (totalization units) to which location data belongs, and area ratios of overlapping portions with the output units (i.e., area ratios of the overlapping portions to the whole of the totalization units) is stored in association with the location data in the feature amount storage unit 17A.

In this case, (feature amount×area ratio) is calculated for location data associated with the same output unit ID, the results of (feature amount×area ratio) are totalized for each output unit, and the number of terminals in each output unit may be estimated by dividing the total value in each output unit by (observation period length×2).

Another conceivable method is as follows: (feature amount×area ratio×scaling factor) is calculated for location data associated with the same output unit ID; the results of (feature amount×area ratio×scaling factor) are totalized for each output unit; the total value in each output unit is divided by (observation period length×2) to estimate a population in each output unit. On that occasion, populations in respective output units and in respective population estimation units may be estimated by totalizing values of (feature amount× area ratio×scaling factor) in respective output units, for each of population estimation units (e.g., attributes, time zones, or the like), and dividing total values in respective output units and in respective population estimation units thus obtained, by (observation period length×2).

The populations in respective output units and in respective population estimation units may be estimated as follows: concerning location data associated with the same output unit ID, (feature amount×area ratio) is calculated for each of population estimation units (e.g., attributes, time zones, or the like); the results of (feature amount×area ratio) in the respective population estimation units are totalized for each of output units; total values in respective output units and in respective population estimation units obtained are multiplied by scaling factors about the population estimation units; the multiplication results thus obtained are divided by (observation period length×2) to obtain the populations in respective output units and in respective population estimation units. In this case, however, it is not essential to associate the location data with the scaling factors, and the foregoing multiplication may be carried out using the scaling factors about the respective population estimation units, for example, those preliminarily stored separately from the location data or those acquired from the outside. After the populations in respective output units and in respective population estimation units are obtained by the above processing, the populations in respective output units and in respective population estimation units may be totalized for each of output units to estimate the populations in respective output units.

As described previously, it is not essential to determine the scaling factors for the respective population estimation units, and, for example, a common scaling factor to all may be used, without need for use of the scaling factors for the respective population estimation units. In this case, as an example, a population may be estimated by totalizing the values of (feature amount×area ratio) on all pieces of location data as targets, multiplying the obtained total value by the common scaling factor, and dividing the multiplication result by (observation period length×2).

The feature amounts used in the various modification examples as described above may be calculated by any one of the methods in the aforementioned first to third embodiments.

The seventh embodiment described the process to convert the populations in respective totalization units into populations in respective output units, based on the fourth embodiment, but the seventh embodiment is also applicable to the aforementioned fifth embodiment. The conversion process described in the seventh embodiment is also applicable to the case where the numbers of terminals in respective totalization units are converted into the numbers of terminals in respective output units, and when it is applied to the aforementioned first to third embodiments, the numbers of terminals in respective totalization units can be converted into the numbers of terminals in respective output units.

[Eighth Embodiment]

The eighth embodiment will describe an embodiment to perform an unidentifiability securing process for removing information with individual identifiability from the location data and attribute information.

Figure 23:
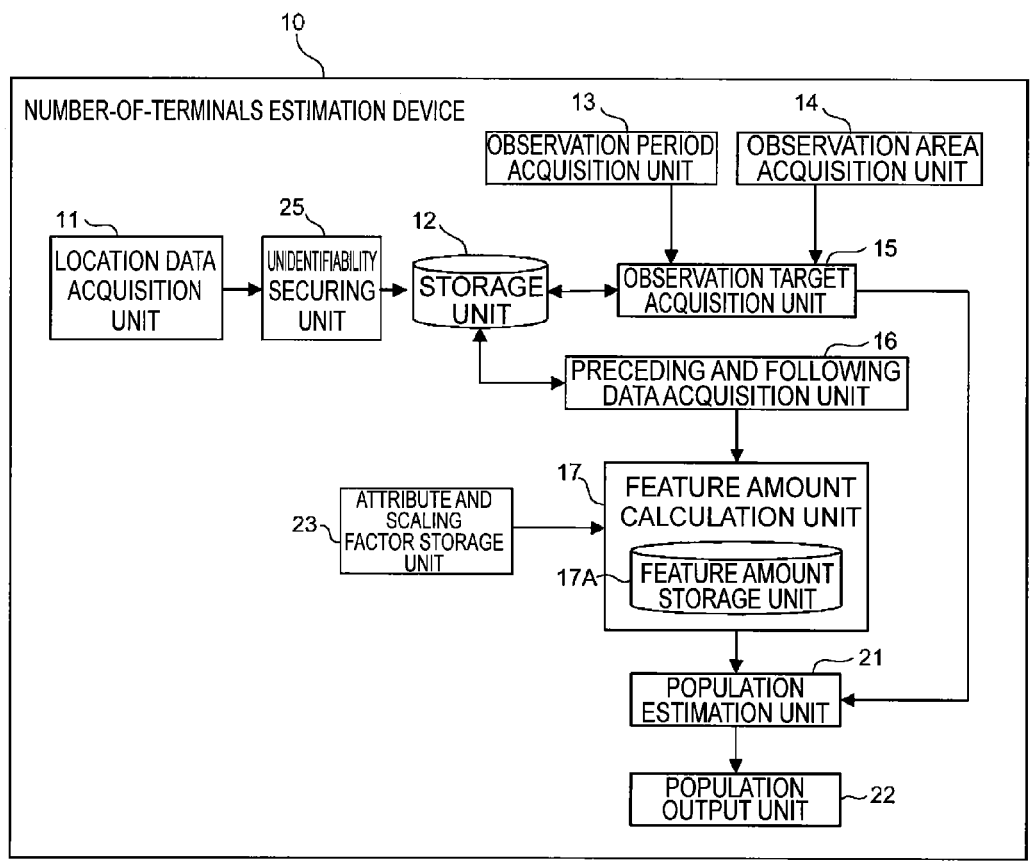
FIG. 23 is a drawing showing a configuration of a number-of-terminals estimation device in the eighth embodiment.

As shown in FIG. 23, the function block configuration of the number-of-terminals estimation device 10 in the eighth embodiment is a configuration wherein an unidentifiability securing unit 25 (unidentifiability securing means) to perform the unidentifiability securing process is added between the location data acquisition unit 11 and the storage unit 12 in the function block configuration of the number-of-terminals estimation device in the fourth embodiment (FIG. 12).

The unidentifiability securing unit 25 performs the unidentifiability securing process including conversion into irreversible code by a one-way function, on the identification information (e.g., a phone number) included in the location data. The one-way function is used herein in order to prevent restoration from information after the conversion, and the one-way function to be used herein can be a keyed hash function based on the hash function recommended by national and international evaluation projects and evaluation organizations, for example, as shown in FIG. 24.

Figure 24:
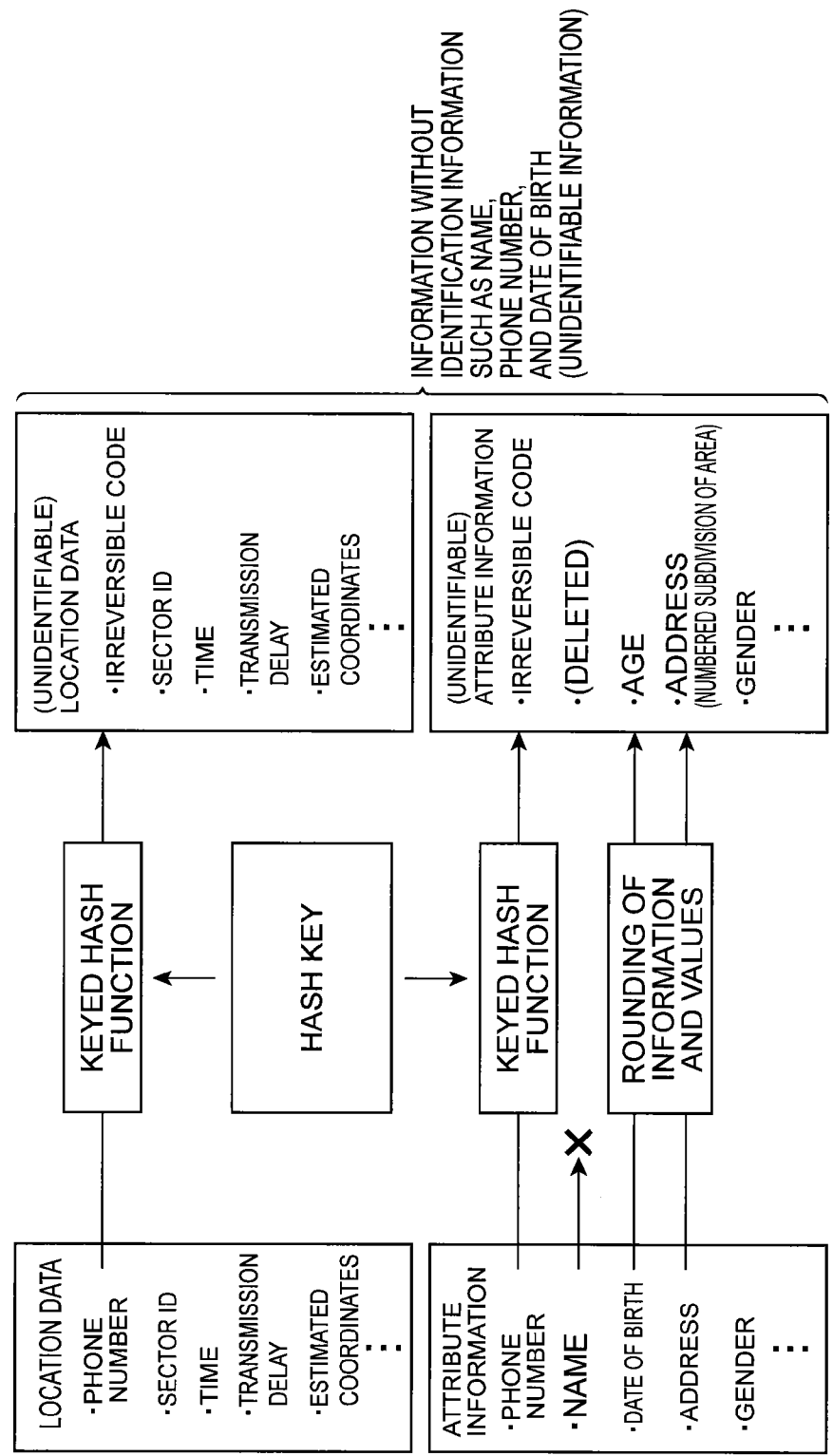
FIG. 24 is a drawing for explaining an example of an unidentifiability securing process.

When a process using the attribute information of a user of a mobile terminal is carried out, as shown in FIG. 24, the unidentifiability securing unit 25 performs the unidentifiability securing process including the conversion into irreversible code by the one-way function, on an individual-identifiable number (e.g., a phone number) in the attribute information, before the process. Furthermore, the unidentifiability securing unit 25 may delete name information in the attribute information, replace date-of-birth information with age information, and replace address information with numbered subdivision address information excluding street number information.

Since the unidentifiability securing process by the unidentifiability securing unit 25 as described above can remove the information with individual identifiability from the location data and attribute information, it can prevent such trouble that an individual is identified from the location data or the attribute information.

The eighth embodiment described the unidentifiability securing process, based on the fourth embodiment, but the eighth embodiment is also applicable to the aforementioned fifth embodiment. The unidentifiability securing process described in the eighth embodiment does not always have to be limited only to the population estimation, but can also be applied to the number-of-terminals estimation described in the first to third embodiments. The unidentifiability securing process described in the eighth embodiment is also applicable to the cases to perform the conversion process as described in the sixth and seventh embodiments.

[Ninth Embodiment]

The ninth embodiment will describe an embodiment wherein a certain estimated value (the number of terminals, a population, or the like) is output after execution of a concealment process on an estimated value on the basis of a predetermined reference.

Figure 25:
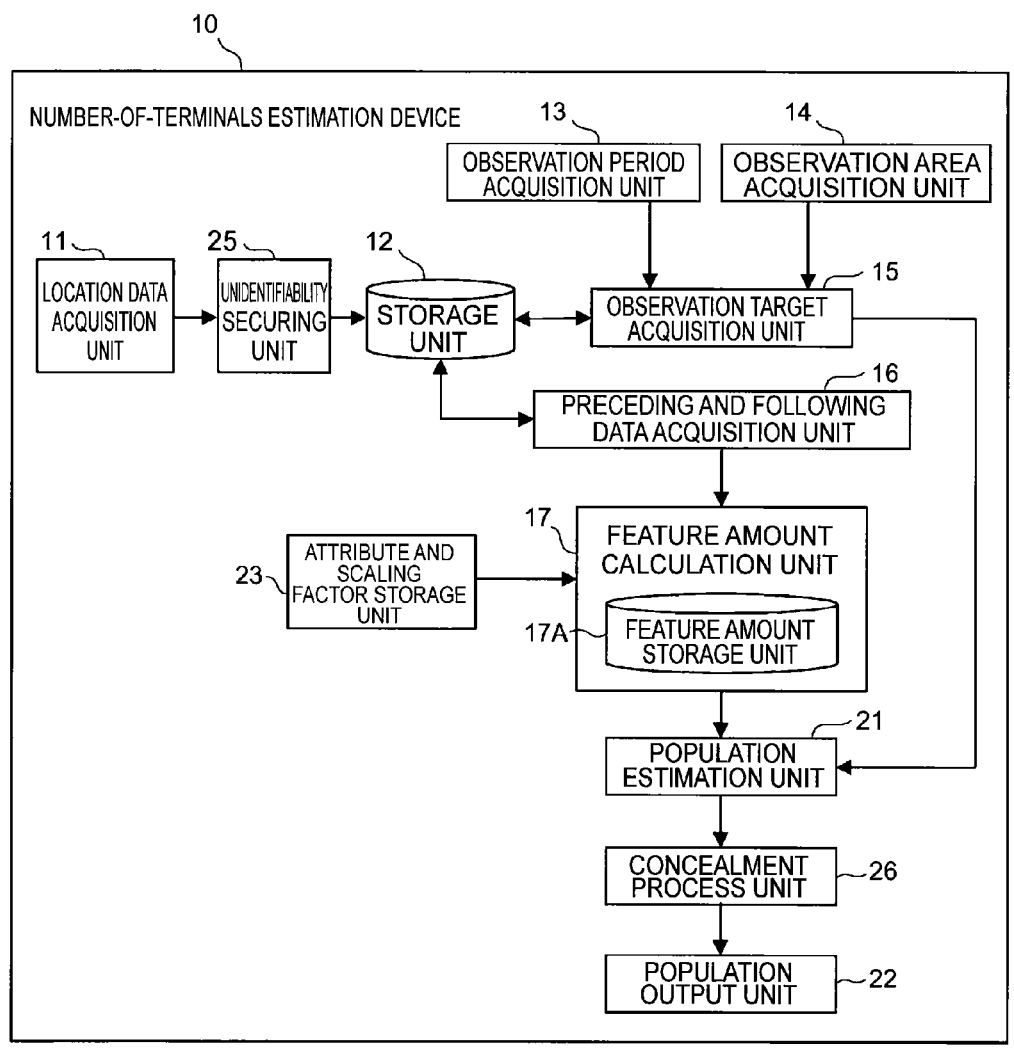
FIG. 25 is a drawing showing a configuration of a number-of-terminals estimation device in the ninth embodiment.

As shown in FIG. 25, the function block configuration of the number-of-terminals estimation device 10 in the ninth embodiment is a configuration wherein a concealment process unit 26 (concealment process means) to perform the concealment process is added between the population estimation unit 21 and the population output unit 22 in the function block configuration of the number-of-terminals estimation device in the eighth embodiment (FIG. 23).

Figure 26:
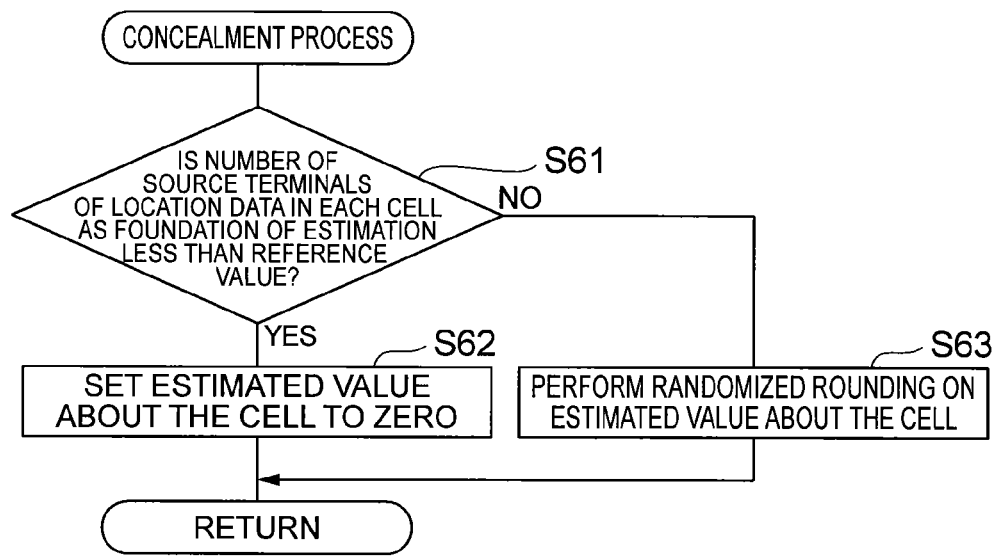
FIG. 26 is a flowchart showing an example of a concealment process.

The concealment process unit 26 performs, for example, the concealment process shown in FIG. 26, when receiving an estimated value (estimated population or the like) from the population estimation unit 21. Namely, the concealment process unit 26 determines whether the number of source terminals indicative of from how may terminals the location data in each area (cell) as foundation of the estimation is acquired, is less than a predetermined reference value (10 as an example) for a determination on necessity of the concealment process (step S61 in FIG. 26). The number of source terminals indicates the unique number of terminals without redundancy of identical terminal. Execution of the determination herein requires the number of source terminals of the location data in each area (cell), and an example thereof is as follows: in totalizing the feature amounts associated with the location data, the population estimation unit 21 counts the number of identification information (e.g., hashed phone numbers after the aforementioned unidentifiability securing process by the unidentifiability securing unit 25) in the location data; the population estimation unit 21 transmits information of the total number of hashed phone numbers thus obtained, to the concealment process unit 26; the concealment process unit 26 uses the total number of hashed phone numbers as the number of source terminals of the location data in each area (cell).

In step S61, if the number of source terminals of the location data in each area (cell) as foundation of the estimation is less than the reference value, the concealment process unit 26 sets the estimated value about the area (cell) to zero, thereby concealing the estimated value (step S62). The concealment method herein is not limited to setting the estimated value to zero, but another method may be adopted, for example, such as a method of expressing the estimated value by a predetermined letter or mark (e.g., "X" or the like).

On the other hand, when it is determined in step S61 that the number of source terminals of the location data in each area (cell) as foundation of the estimation is not less than the reference value, the concealment process unit 26 performs randomized rounding of a class interval used in output of estimated value, which is described below, on the estimated value about the area (cell) (step S63). Namely, let x be the estimated value about an area (cell) and k be the class interval; then, when kn≤x≤k(n+1) (n is an integer), the concealment process unit 26 rounds the estimated value x to k(n+1) with a probability of (x−kn)/k and to kn with a probability of (k(n+1)−x)/k.

For example, in a case where the estimated value x is 23 and where the class interval k is 10, k×2≤x<k(2+1) and thus n=2; the estimated value "23" is rounded to "30" with the probability of 0.3 (probability of 30%) and to "20" with the probability of 0.7 (probability of 70%).

The concealment process by the concealment process unit 26 as described above can prevent an individual from being identified from the estimation result and enhance availability of the estimation result. It can also prevent such trouble that the concealed value can be speculated from other values.

The class interval in the randomized rounding may be determined as follows: the location data with a maximum scaling factor is extracted from the location data used in totalization; the scaling factor is multiplied by a predetermined number (e.g., 10); the result of the multiplication is set as the class interval. It is also possible to preliminarily determine the class interval and perform the randomized rounding therewith. On that occasion, it is possible to adopt a process rule of discarding data of an area (cell) including the location data the scaling factor of which exceeds a predetermined ratio (e.g., 1/10) of the predetermined class interval.

The concealment process by the concealment process unit 26 does not have to be limited only to the process shown in FIG. 26, but another process may also be adopted. For example, in step S61 in FIG. 26, a determination may be made on whether "the number of location data in each area (cell) as foundation of the estimation" is less than a reference value or on whether "an output estimated value (population or the number of terminals)" is less than a reference value, instead of "the number of source terminals of the location data in each area (cell) as foundation of the estimation." When the determination in step S61 in FIG. 26 is negative, the process in step S63 may be omitted.

The ninth embodiment described the concealment process based on the eighth embodiment (the embodiment to perform the unidentifiability securing process), but it can also be applied to cases where the unidentifiability securing process as in the eighth embodiment is not carried out. The ninth embodiment is also applicable to the population estimation described in the fourth and fifth embodiments and is also applicable to the number-of-terminals estimation described in the first to third embodiments. The ninth embodiment is also applicable to cases where the conversion process described in the sixth and seventh embodiments is carried out.

Now, let us describe the population estimation units and the output units and output forms associated with output in the aforementioned various embodiments, below.

A population estimation unit can be set according to at least one of attributes (ages, genders, addresses, or the like) of users, time zones, and places (sectors, meshes, or the like). For example, when a certain attribute is defined as a population estimation unit, the population estimation unit 21 can estimate a population in each attribute as the population estimation unit, as also described in the fourth embodiment, by multiplying the feature amounts associated with respective pieces of observation target location data, by the scaling factor, in each attribute as the population estimation unit, based on the attribute information associated with the respective pieces of observation target location data, and dividing the sum of the multiplication results by (observation length× 2). For example, as shown in FIG. 16, the device can output the population estimated for the observation area, and the populations in respective attributes such as genders, age groups, and addresses. It is also possible to adopt a combinational condition of multiple attributes (e.g., a condition of "women residing in Tokyo" as a combination of a gender with an address). When time zones, for example, at one-hour intervals in each day are defined as population estimation units, the population estimation unit 21 can estimate populations in respective time zones by specifying to which time zone each observation target location data corresponds, based on the acquisition time information in each observation target location data, multiplying the feature amounts associated with respective pieces of observation target location data, by scaling factors, and dividing the sum of the multiplication results by (observation length×2), in each of the time zones at one-hour intervals. When the time zones are set as population estimation units, they may be discontinuous time zones along a time sequence (e.g., time zones from 13:00 to 14:00 every day, time zones from 10:00 to 11:00 in Saturday and Sunday every week, and so on.

On the other hand, the output unit associated with the output can also be set, in the same manner as the estimation unit, according to at least one of attributes (ages, genders, addresses, or the like) of users, time zones, and places (sectors, meshes, or the like).

Figure 27:
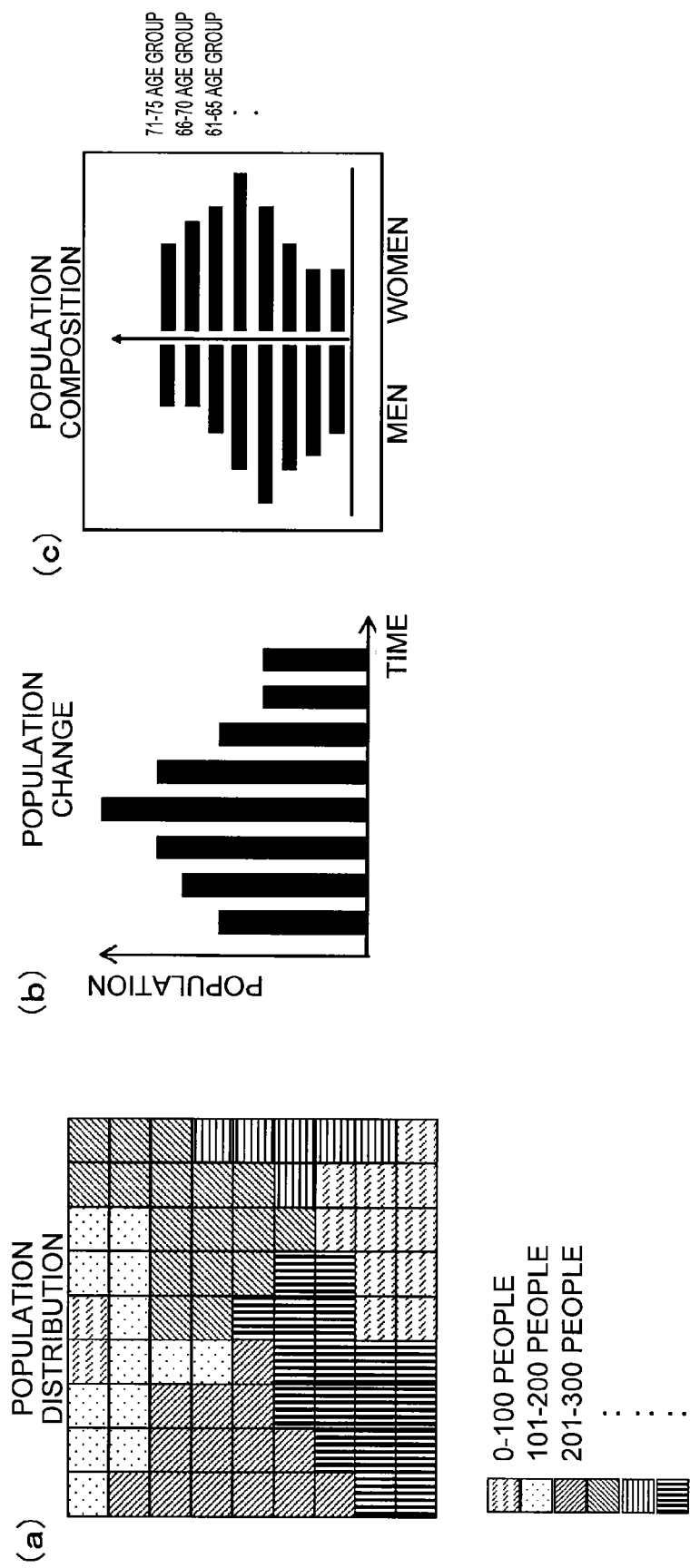
FIG. 27 is a drawing showing a population distribution, a population change, and a population composition as examples of output forms.

An output form associated with the output can be selected from a variety of output forms, for example, such as a drawing showing a population distribution shown in (a) of FIG. 27, a drawing showing a time-series population change shown in (b) of FIG. 27, and a drawing showing a population composition shown in (c) of FIG. 27. Furthermore, concerning each of these output forms, the output may be provided for each one or combination of two or more out of the user attributes (ages, genders, addresses, or the like), time zones, and places (sectors, meshes, or the like), and the output can be, for example, a population composition of men and women in respective age groups at 5-year intervals as shown in (c) of FIG. 27.

Next, a modification example about the feature amount will be described. The aforementioned first and second embodiments showed the examples in which the time difference between the preceding and following location data (the time difference between the second location data and the third location data) before and after the location data as a target for calculation of the feature amount (first location data) was calculated as the feature amount of the first location data. Expressing this by an equation, the feature amount can be expressed by Equation (7) below. The below Equation (7) is a modification of the aforementioned Equation (4) and is equivalent to Equation (4) (namely, there is no change in the conception of Equation (4)).

$$w_{ij} = u_{i(j+1)} - u_{i(j-1)} \qquad (7)$$

The present modification example shows another variation of the feature amount calculation method in the feature amount calculation unit 17.

In the present modification example, when the feature amount calculation unit 17 calculates the feature amount of the first location data, it takes account of class information (e.g., below-described generation factor (generation timing) of location data) on the second location data and the third location data. Specifically, the feature amount calculation unit 17 calculates a value of a multiplication of the time difference between the third location data and the first location data by a correction factor α corresponding to the class information of the third location data (generation factor herein) and calculates a value of a multiplication of the time difference between the first location data and the second location data by a correction factor β corresponding to the class information of the second location data (generation factor herein). However, instead of the above factors, the feature amount calculation unit 17 may determine the correction factor α or β according to the class information of the first location data or may determine the correction factor β according to the class information of the first and second location data and determine the correction factor α according to the class information of the first and third location data. Then the feature amount calculation unit 17 defines a value obtained by adding the results of these multiplications, as the feature amount of the first location data. When the feature amount calculation process in the feature amount calculation unit 17 is expressed by an equation, it is represented by Equation (8) below.

$$w_{ij}=\alpha(u_{i(j+1)}-u_{ij})+\beta(u_{ij}-u_{i(j-1)}) \tag{8}$$

For example, when the location data is the location registration information, the class information about the second location data and the third location data can be information about the generation factor of the location registration information, and this information about the generation factor is included in the generated location registration information. Examples of such generation factors of location registration information include a crossing of a terminal across a border of a location registration area (Location Area), generation based on location registration performed at regular intervals, execution of an attaching process by a power-on operation of a terminal or the like, execution of a detaching process by a power-off operation of a terminal, and so on, and set values of the correction factors α and β are preliminarily defined corresponding to these generation factors. Then the feature amount calculation unit 17 can set the correction factor α on the third location data in accordance with the information about the generation factor of the third location data and set the correction factor β on the second location data in accordance with the information about the generation factor of the second location data. The correction factors α, β both may be preliminarily determined as values of not less than 0 and not more than 1. However, this numerical range is not essential.

For example, in the case of the location registration information the generation timing of which is irrespective of the location of the terminal like the location registration information based on location registrations performed at regular intervals, expectations of time when the terminal has stayed in a current sector are considered to be the same before and after generation of the location registration information. On the other hand, when the location registration information is one generated because of a crossing of a terminal across a location registration area border, it can be determined that the terminal did not stay in the current sector, at least before generation of the location registration information. For this reason, a duration of period when the terminal stayed in the current sector before generation of the location registration information can be considered to be 0, and when the class information (generation factor) of the first location data is "a crossing across a location registration area border," the correction factor β in above Equation (8) (i.e., the correction factor β about the time difference from the immediately-preceding location data) can be set to 0. This allows the device to calculate the feature amount better agreeing with the actual condition. When the class information (generation factor) of the first location data is "a crossing across a location registration area border" in this manner, the calculation of the feature amount with the correction factor β of 0 can achieve the same effect as in the aforementioned third embodiment.

As described above, when the feature amount calculation unit 17 calculates the feature amount of the target location data (first location data), it corrects the time differences from the second location data and the third location data in accordance with the class information on the second and third location data (generation factor of the location data as an example) being the preceding and flowing location data before and after the first location data, and calculates the feature amount using the corrected time difference. This allows the device to calculate the feature amount more accurately, based on the class information of the location data.

List of Reference Signs

1: communication system; 10: number-of-terminals estimation device; 11: location data acquisition unit; 12: storage unit; 13: observation period acquisition unit; 14: observation area acquisition unit; 15: observation target acquisition unit; 16: preceding and following location data acquisition unit; 17: feature amount calculation unit; 17A: feature amount storage unit; 18: number-of-terminals estimation unit; 19: number-of-terminals output unit; 21: population estimation unit; 22: population output unit; 23: attribute and scaling factor storage unit; 24: conversion unit; 25: unidentifiability securing unit; 26: concealment process unit; 100: mobile terminal; 200: BTS; 300: RNC; 400: exchange; 500: management center; 501: social sensor unit; 502: peta-mining unit; 503: mobile demography unit; 504: visualization solution unit; 700: various processing node.

The invention claimed is:

1. A number-of-terminals estimation system comprising:
circuitry configured to
   acquire location data including identification information to identify a mobile terminal, location information about a location of the mobile terminal, and location acquisition time information on a time when the location information is acquired;
   acquire as observation target location data, one or more pieces of the location data, each as first location data, including location acquisition time information after an observation start time and before an observation end time about an observation period to be observed, and including location information associated with observation area information about an observation area to be observed;
   for each piece of the first location data, acquire location acquisition time information of second location data which is location data acquired at a time preceding the first location data, and location acquisition time information of third location data which is location data acquired at a time following the first location data, from location data including the same identification information as that of the first location data;
   for each piece of the first location data, calculate a feature amount of the first location data, based on at least two of the location acquisition time information of the first location data, the location acquisition time information of the second location data, and the location acquisition time information of the third location data;
and
   estimate a value of a number of mobile terminals located in the observation area during the observation period, based on the feature amount calculated for each piece of the first location data, and a length of the observation period which is a difference between the observation start time and the observation end time.

2. The number-of-terminals estimation system according to claim 1,
wherein the circuitry is configured to
calculate a difference between a location acquisition time of the second location data and a location acquisition time of the third location data, as the feature amount of the first location data, and
estimate the number of terminals to be a numeral obtained by dividing a sum of feature amounts of the observation target location data by twice the length of the observation period.

3. The number-of-terminals estimation system according to claim 2,
wherein the circuitry is configured to operate as follows:
when a difference between a location acquisition time of the first location data and the location acquisition time of the second location data is larger than a predetermined value, the circuitry is configured to calculate the feature amount of the first location information, using as the location acquisition time of the second location data, a time set backward by a predetermined time from the location acquisition time of the first location data;
when a difference between the location acquisition time of the first location data and the location acquisition time of the third location data is larger than a predetermined value, the circuitry is configured to calculate the feature amount of the first location information, using as the location acquisition time of the third location data, a time set forward by a predetermined time from the location acquisition time of the first location data.

4. The number-of-terminals estimation system according to claim 1,
wherein the circuitry is configured to
make a determination on whether or not the first location data includes location registration information generated due to the mobile terminal crossing across a location registration area border, and a determination on whether or not the third location data includes location registration information generated due to the mobile terminal crossing across a location registration area border;
calculate the feature amount of the first location data, using at least two of the location acquisition time information of the first location data, the location acquisition time information of the second location data, and the location acquisition time information of the third location data, according to the result of the determination on whether or not the first location data includes location registration information generated due to the mobile terminal crossing across a location registration area border and the result of the determination on whether or not the third location data includes location registration information generated due to the mobile terminal crossing across a location registration area border.

5. The number-of-terminals estimation device according to claim 4,
wherein the circuitry is configured to set a location acquisition time of the first location data to a first variable when the first location data includes location registration information generated due to the mobile terminal crossing across a location registration area border;
set a midpoint time between the location acquisition time of the first location data and a location acquisition time of the second location data to the first variable when the first location data does not include location registration information generated due to the mobile terminal crossing across a location registration area border;
set a location acquisition time of the third location data to a second variable when the third location data includes location registration information generated due to the mobile terminal crossing across a location registration area border;
set a midpoint time between the location acquisition time of the first location data and the location acquisition time of the third location data to the second variable when the third location data does not include location registration information generated due to the mobile terminal crossing across a location registration area border;
calculate the feature amount of the first location data, based on a difference between the set first variable and second variable.

6. The number-of-terminals estimation system according to claim 4,
wherein the circuitry is configured to
calculate the feature amount of the first location data, using as a first variable, a time set earlier by a predetermined amount of time from the location acquisition time of the first location data when a difference between a location acquisition time of the first location data and the first variable is larger than a predetermined value;
calculate the feature amount of the first location data, using as a second variable, a time set later by a predetermined amount of time from the location acquisition time of the first location data when a difference between the location acquisition time of the first location data and the second variable is larger than a predetermined value.

7. The number-of-terminals estimation system according to claim 1,
wherein
the circuitry is configured to define each piece of the observation target location data as the first location data, and acquire, for the first location data, the location acquisition time information of the second location data and the location acquisition time information of the third location data,
calculate the feature amount of each piece of the observation target location data, and
estimate the number of terminals, using feature amounts of respective pieces of the observation target location data obtained by the calculation.

8. The number-of-terminals estimation system according to claim 1,
wherein the circuitry is configured to
define each piece of all location data as the first location data, and acquire, for the first location data, the location acquisition time information of the second location data and the location acquisition time information of the third location data,
calculate the feature amount of each piece of all the location data, and
estimate the number of terminals, using feature amounts of the observation target location data among feature amounts of respective pieces of all the location data obtained by the calculation.

9. The number-of-terminals estimation system according to claim 1, wherein the circuitry is configured to
store a scaling factor for conversion of the number of terminals into a population,
estimate at least one of a population in the observation area during the observation period, and populations in respective population estimation units which are units of estimation for population, based on feature amounts of the observation target location data, the length of the observation period, and the scaling factor.

10. The number-of-terminals estimation system according to claim 9, wherein the scaling factor is derived using the number of terminals estimated based on the feature amounts and the length of the observation period.

11. The number-of-terminals estimation system according to claim 1, wherein the circuitry is further configured to
convert estimated values in respective observation areas, into estimated values in respective output units different from the observation areas, based on area ratios of overlap regions between the output units and the observation areas to the observation areas.

12. The number-of-terminals estimation system according to claim 11, wherein the circuitry is configured to obtain the estimated values in the respective output units by performing conversion into the estimated values in the respective output units based on the area ratios for each of the overlapping communication regions and addition of the estimated values after the conversion for each of the communication regions when there are at least two communication areas out of a communication area of an indoor station and communications areas of a plurality of outdoor stations using respective frequency bands with different coverage areas, overlapping in a geographically identical observation area.

13. The number-of-terminals estimation system according to claim 1,
wherein the circuitry is configured to estimate populations separately in respective output units and in respective population estimation units, based on feature amounts of the observation target location data, the length of the observation period, a scaling factor for conversion of the number of terminals into a population, and area ratios of overlap regions between observation areas and output units different from the observation areas to the observation areas.

14. The number-of-terminals estimation system according to claim 13,
wherein, prior to the estimation of populations, the circuitry is configured to associate location data with the feature amount, the scaling factor, and a combination of the area ratio and an output unit ID related to the area ratio, and
calculate a product of the feature amount, the area ratio, and the scaling factor on location data with which the same output unit ID is associated, totalize values of the calculated product in respective output units obtained, for each of the population estimation units, and estimate the populations in respective output units and in respective population estimation units, based on total values in respective output units and in respective population estimation units obtained and the length of the observation period.

15. The number-of-terminals estimation system according to claim 1, wherein the circuitry is further configured to
acquire observation period information including a set of an observation start time and an observation end time; and
acquire observation area information associated with one or more pieces of location information.

16. The number-of-terminals estimation system according to claim 1, wherein the circuitry is further configured to output the estimated value obtained.

17. The number-of-terminals estimation system according to claim 16,
wherein the output form is configured to be at least one of an image showing a population distribution, an image showing a time-series population change, and an image showing a population composition, and wherein an output unit is configured to be set according to at least one of an attribute of a user of a mobile terminal, a time zone, and a place.

18. The number-of-terminals estimation system according to claim 1, wherein the circuitry is further configured to
perform a securing process including a conversion into irreversible code by a one-way function on identification information included in the location,
perform the securing process on the attribute information before a process when the process using attribute information of a user of a mobile terminal is carried out.

19. The number-of-terminals estimation system according to claim 1, wherein the circuitry is further configured to
perform a concealment process on an estimated value on the basis of a predetermined reference before the estimated value obtained is output.

20. The number-of-terminals estimation system according to claim 19,
wherein the circuitry is configured to determine whether or not a value of a number of source terminals indicative of from how many terminals the location data in each area as foundation of estimation was acquired, is less than a reference value for a determination that the concealment process is needed, and output a data, while not to include the estimated value about the area, when the value of the number of source terminals of the location data in an area is less than the reference value.

21. The number-of-terminals estimation system according to claim 20,
wherein the circuitry is configured to
estimate a value on the area, based on an upper limit value and a lower limit value of a class to which the estimated value on the area belongs out of a plurality of classes used in output of estimated value, a class interval, and the estimated value, to the upper limit value and the lower limit value with respective probability values according to a difference from the upper limit value and a difference from the lower limit value when the number of source terminals of the location data in an area is not less than the reference.

22. A number-of-terminals estimation system comprising:
circuitry configured to
acquire location data including identification information to identify a mobile terminal, location information about a location of the mobile terminal, and location acquisition time information on a time when the location information is acquired;
acquire as observation target location data, one or more pieces of location data, each as first location data, including location acquisition time information after an observation start time and before an observation end time about an observation period to be observed, and including location information associated with observation area information about an observation area to be observed;
for each piece of the first location data, acquire location acquisition time information of second location data which is location data acquired at a time preceding the first location data, and location acquisition time information of third location data which is location data acquired at a time following the first location data, from location data including the same identification information as that of the first location data;

for each piece of the first location data, calculate a feature amount of the first location data, based on at least a location acquisition time of the second location data and a location acquisition time of the third location data; and estimate a value of a number of mobile terminals located in the observation area during the observation period, based on the feature amount calculated for each piece of the first location data, and a length of the observation period which is a difference between the observation start time and the observation end time.

23. A number-of-terminals estimation method executed by a number-of-terminals estimation system having circuitry, comprising:

acquiring location data including identification information to identify a mobile terminal, location information about a location of the mobile terminal, and location acquisition time information on a time when the location information is acquired;

acquiring as observation target location data, one or more pieces of location data, each as first location data, including location acquisition time information after an observation start time and before an observation end time about an observation period to be observed, and including location information associated with observation area information about an observation area to be observed;

for each piece of the first location data, acquiring location acquisition time information of second location data which is location data acquired at a time preceding the first location data and location acquisition time information of third location data which is location data acquired at a time following the first location data, from location data including the same identification information as that of the first location data;

for each piece of the first location data, calculating a feature amount of the first location data, based on at least two of the location acquisition time information of the first location data, the location acquisition time information of the second location data, and the location acquisition time information of the third location data; and estimating, by the circuitry, a value of a number of mobile terminals located in the observation area during the observation period, based on the feature amount calculated for each piece of the first location data obtained by the calculation, and a length of the observation period which is a difference between the observation start time and the observation end time.

24. A number-of-terminals estimation method executed by a number-of-terminals estimation system having circuitry, comprising:

acquiring location data, each piece being acquired as first location data, including identification information to identify a mobile terminal, location information about a location of the mobile terminal, and location acquisition time information on a time when the location information is acquired;

for each piece of the first location data, acquiring location acquisition time information of second location data which is location data acquired at a time preceding the first location data and location acquisition time information of third location data which is location data acquired at a time following the first location data, from location data including the same identification information as that of the first location data;

calculating feature amounts of respective pieces of all the first location data, based on at least two of the location acquisition time information of the first location data, the location acquisition time information of the second location data, and the location acquisition time information of the third location data;

acquiring as observation target location data, one or more pieces of the first location data including location acquisition time information after an observation start time and before an observation end time about an observation period to be observed, and including location information associated with observation area information about an observation area to be observed; and estimating, by the circuitry, a value of a number of mobile terminals located in the observation area during the observation period, based on a feature amount of the observation target location data out of the feature amounts of the respective pieces of all the first location data obtained by calculation, and a length of the observation period which is a difference between the observation start time and the observation end time.

25. A number-of-terminals estimation method executed by a number-of-terminals estimation system having circuitry, comprising:

acquiring location data including identification information to identify a mobile terminal, location information about a location of the mobile terminal, and location acquisition time information on a time when the location information is acquired;

acquiring as observation target location data, one or more pieces of location data, each as first location data, including location acquisition time information after an observation start time and before an observation end time about an observation period to be observed, and including location information associated with observation area information about an observation area to be observed;

for each piece of the first location data, acquiring location acquisition time information of second location data which is location data acquired at a time preceding the first location data and location acquisition time information of third location data which is location data acquired at a time following the first location data, from location data including the same identification information as that of the first location data;

for each piece of the first location data, calculating a feature amount of the first location data, based on at least a location acquisition time of the second location data and a location acquisition time of the third location data; and estimating, by the circuitry, a value of a number of mobile terminals located in the observation area during the observation period, based on the feature amount calculated for each piece of the first location data, and a length of the observation period which is a difference between the observation start time and the observation end time.

26. A number-of-terminals estimation method executed by a number-of-terminals estimation system having circuitry, comprising:

acquiring location data, each piece being acquired as first location data, including identification information to identify a mobile terminal, location information about a location of the mobile terminal, and location acquisition time information on a time when the location information is acquired;

for each piece of the first location data, acquiring location acquisition time information of second location data which is location data acquired at a time preceding the first location data and location acquisition time information of third location data which is location data acquired at a time following the first location data, from location data including the same identification information as that of the first location data;

calculating a feature amount of each piece of all the first location data, based on at least a location acquisition time of the second location data and a location acquisition time of the third location data;

acquiring as observation target location data, one or more pieces of the first location data including location acquisition time information after an observation start time and before an observation end time about an observation period to be observed, and including location information associated with observation area information about an observation area to be observed; and estimating, by the circuitry, a value of a number of mobile terminals located in the observation area during the observation period, based on a feature amount of the observation target location data out of the feature amounts of the respective pieces of all the first location data obtained by the calculation, and a length of the observation period which is a difference between the observation start time and the observation end time.

* * * * *